US012091894B2

(12) United States Patent
Steen et al.

(10) Patent No.: US 12,091,894 B2
(45) Date of Patent: Sep. 17, 2024

(54) WINDOW BALANCE SYSTEMS

(71) Applicant: Amesbury Group, Inc., Edina, MN (US)

(72) Inventors: Travis Steen, Sioux Falls, SD (US); Tyler Welbig, Harrisburg, SD (US)

(73) Assignee: Amesbury Group, Inc., Edina, MN (US)

( * ) Notice: Subject to any disclaimer, the term of this patent is extended or adjusted under 35 U.S.C. 154(b) by 0 days.

(21) Appl. No.: 18/084,721

(22) Filed: Dec. 20, 2022

(65) Prior Publication Data

US 2023/0127447 A1 Apr. 27, 2023

Related U.S. Application Data

(63) Continuation of application No. 16/838,175, filed on Apr. 2, 2020, now Pat. No. 11,560,743.
(Continued)

(51) Int. Cl.
*E05D 13/00* (2006.01)
*E05D 15/22* (2006.01)

(52) U.S. Cl.
CPC .......... *E05D 13/123* (2013.01); *E05D 15/22* (2013.01); *E05Y 2900/148* (2013.01)

(58) Field of Classification Search
CPC ... E05D 13/123; E05D 13/1207; E05D 15/22; E05Y 2900/148; E05Y 2201/654
See application file for complete search history.

(56) References Cited

U.S. PATENT DOCUMENTS 601,283 A * 3/1898 Sawyer et al. .......... E05D 13/00 16/201
698,168 A 4/1902 Barnum
(Continued)

FOREIGN PATENT DOCUMENTS

CA 1155341 10/1983
CA 2119506 10/1994
(Continued)

OTHER PUBLICATIONS

"Request for Ex-Parte Reexamination of U.S. Pat. No. 9,133,656 Pursuant to 37 CFR 1.510 et seq", in U.S. Appl. No. 13/081,089, entitled *Inverted Constant Force Window Balance for Tilt Sash*, filed Feb. 26, 2016, 19 pgs.
(Continued)

*Primary Examiner* — William L Miller
(74) *Attorney, Agent, or Firm* — Merchant & Gould P.C.

(57) ABSTRACT

A window balance system includes a U-shaped channel with a first end and an opposite second end, and a balance element supported within the U-shaped channel. The balance element includes a fixed pulley block coupled to the first end of the U-shaped channel, a movable pulley block movably disposed in the U-shaped channel, and a cord extending between the fixed pulley block and the movable pulley block. The window balance system includes a locking device coupled to the fixed pulley block and configured to engage with the cord and lock a position of the fixed pulley block with respect to the cord. The window balance system also includes a shoe coupled to the second end of the U-shaped channel. The shoe includes an elongate portion and an enlarged portion such that the shoe is substantially T-shaped, and a chamber configured to receive at least a portion of a pivot bar.

19 Claims, 25 Drawing Sheets

Related U.S. Application Data

(60) Provisional application No. 62/869,848, filed on Jul. 2, 2019, provisional application No. 62/828,208, filed on Apr. 2, 2019.

(56) References Cited

U.S. PATENT DOCUMENTS 887,968 A 5/1908 Selkirk
1,007,212 A 10/1911 Lasersohn
1,312,665 A 8/1919 Almquist
1,420,503 A 6/1922 Throne
1,480,453 A 1/1924 Lane
1,742,803 A 1/1930 Biron
2,069,025 A 1/1937 Anderson
2,178,533 A 10/1939 Viehweger
2,209,293 A 7/1940 Cannon et al.
2,602,958 A 7/1952 Brown
2,609,191 A 9/1952 Foster
2,609,193 A 9/1952 Foster
2,622,267 A 12/1952 Peremi
2,635,282 A 4/1953 Trammell, Sr. et al.
2,644,193 A 7/1953 Anderberg
2,684,499 A 7/1954 Lewis
2,732,594 A 1/1956 Adams et al.
2,739,344 A 3/1956 Dickinson
2,766,492 A 10/1956 Day et al.
2,807,045 A 9/1957 Chenoweth
2,817,872 A 12/1957 Foster
2,851,721 A 9/1958 Decker et al.
2,873,472 A 2/1959 Foster
2,952,884 A 9/1960 Dinsmore
3,007,194 A 11/1961 Griswold
3,105,576 A 10/1963 Jones et al.
3,150,420 A 9/1964 Brenner
3,184,784 A 5/1965 Peters
3,364,622 A 1/1968 Collard
3,434,236 A 3/1969 Weidner et al.
3,445,964 A 5/1969 Foster
3,452,480 A 7/1969 Foster
3,461,608 A 8/1969 Johnson
3,475,865 A 11/1969 Arnes
3,497,999 A 3/1970 Hendra
3,529,381 A 9/1970 Grossman
3,676,956 A 7/1972 Taylor et al.
3,732,594 A 5/1973 Mills
3,820,193 A 6/1974 Foster
3,844,066 A 10/1974 Nobes
3,869,754 A 3/1975 Foster
3,992,751 A 11/1976 Foster et al.
4,028,849 A 6/1977 Anderson
4,068,406 A 1/1978 Wood
4,079,549 A 3/1978 Wood
4,089,085 A 5/1978 Fitzgibbon
4,190,930 A 3/1980 Prosser
4,227,345 A 10/1980 Durham, Jr.
4,228,620 A 10/1980 Hutchins
4,300,316 A 11/1981 Ficurilli
4,332,054 A 6/1982 Paist et al.
4,364,199 A 12/1982 Johnson et al.
4,446,654 A 5/1984 Schoolman et al.
4,452,012 A 6/1984 Deal
4,506,478 A 3/1985 Anderson
4,510,713 A 4/1985 Anderson
4,517,766 A 5/1985 Haltof
4,555,868 A 12/1985 Mancuso
4,570,382 A 2/1986 Suess
4,571,887 A 2/1986 Haltof
4,590,708 A 5/1986 Campodonico
4,610,108 A 9/1986 Marshik
4,642,845 A 2/1987 Marshik
4,683,676 A 8/1987 Sterner, Jr.
4,689,850 A 9/1987 Flight
4,697,304 A 10/1987 Overgard
4,704,821 A 11/1987 Berndt
4,718,194 A 1/1988 FitzGibbon et al.
4,724,577 A * 2/1988 Langley .............. E05D 13/1207 16/214
4,785,581 A 11/1988 Abramson et al.
4,799,333 A 1/1989 Westfall et al.
4,837,976 A 6/1989 Westfall et al.
4,854,077 A 8/1989 Rogers et al.
4,885,871 A 12/1989 Westfall et al.
4,888,915 A 12/1989 Goldenberg
4,914,861 A 4/1990 May
4,922,657 A 5/1990 Foss
4,930,254 A 6/1990 Valentin
4,935,987 A 6/1990 Sterner, Jr.
4,941,285 A 7/1990 Westfall
4,949,425 A 8/1990 Dodson et al.
4,953,258 A 9/1990 Mennuto
4,958,462 A 9/1990 Cross
4,961,247 A 10/1990 Leitzel et al.
5,035,081 A 7/1991 Yamamoto et al.
5,036,621 A 8/1991 Iwasaki
5,069,001 A 12/1991 Makarowski
5,113,922 A 5/1992 Christensen et al.
5,119,591 A 6/1992 Sterner, Jr. et al.
5,119,592 A 6/1992 Westfall et al.
5,127,192 A 7/1992 Cross
5,140,769 A 8/1992 Hickson et al.
5,157,808 A 10/1992 Sterner, Jr.
5,189,838 A 3/1993 Westfall
5,210,976 A 5/1993 Cripps
5,232,208 A 8/1993 Braid et al.
5,251,401 A 10/1993 Prete et al.
5,301,467 A 4/1994 Schmidt et al.
5,353,548 A 10/1994 Westfall
5,365,638 A 11/1994 Braid et al.
5,371,971 A 12/1994 Prete
5,377,384 A 1/1995 Riegelman
5,383,303 A 1/1995 Nakanishi et al.
D355,262 S 2/1995 Chaney et al.
5,440,837 A 8/1995 Piltinsgrud
5,445,364 A 8/1995 Tibbals, Jr.
5,448,858 A 9/1995 Briggs et al.
5,452,495 A 9/1995 Briggs
5,463,793 A 11/1995 Westfall
5,463,795 A 11/1995 Carlson et al.
5,530,991 A 7/1996 deNormand et al.
5,544,450 A 8/1996 Schmidt et al.
5,553,903 A 9/1996 Prete et al.
5,566,507 A 10/1996 Schmidt et al.
5,572,828 A 11/1996 Westfall
5,615,452 A 4/1997 Habbersett
5,632,117 A 5/1997 Prete et al.
5,632,118 A 5/1997 Stark
5,661,927 A 9/1997 Polowinczak et al.
5,669,180 A 9/1997 Maier
5,697,188 A 12/1997 Fullick et al.
5,699,636 A 12/1997 Stark
5,704,165 A 1/1998 Slocomb et al.
5,737,877 A 4/1998 Meunier et al.
5,802,767 A 9/1998 Slocomb et al.
5,806,243 A 9/1998 Prete et al.
5,806,900 A 9/1998 Bratcher et al.
5,829,196 A 11/1998 Maier
5,852,854 A 12/1998 Pierrot et al.
5,855,092 A 1/1999 Raap et al.
5,873,199 A 2/1999 Meunier et al.
5,924,243 A 7/1999 Polowinczak et al.
5,927,013 A 7/1999 Slocomb et al.
5,943,822 A 8/1999 Slocomb et al.
5,996,283 A 12/1999 Maier
6,032,417 A 3/2000 Jakus et al.
6,041,475 A 3/2000 Nidelkoff
6,041,476 A 3/2000 deNormand
6,041,550 A 3/2000 Tix
6,058,653 A 5/2000 Slocomb et al.
6,119,398 A 9/2000 Yates, Jr.
D434,637 S 12/2000 Habeck et al.
6,155,615 A 12/2000 Schultz
6,161,335 A 12/2000 Beard et al.
6,161,657 A 12/2000 Zhuang
6,178,696 B1 1/2001 Liang

(56) References Cited

U.S. PATENT DOCUMENTS

| | | | |
|---|---|---|---|
| 6,226,923 | B1 | 5/2001 | Hicks et al. |
| 6,305,126 | B1 | 10/2001 | Hendrickson et al. |
| 6,332,288 | B1 | 12/2001 | Guillemet et al. |
| 6,378,169 | B1 | 4/2002 | Batten et al. |
| 6,393,661 | B1 | 5/2002 | Braid et al. |
| D462,258 | S | 9/2002 | Meunier |
| D464,256 | S | 10/2002 | Meunier |
| 6,467,128 | B1 | 10/2002 | Damani |
| 6,470,530 | B1 | 10/2002 | Trunkle |
| D467,490 | S | 12/2002 | Uken et al. |
| 6,553,620 | B2 | 4/2003 | Guillemet et al. |
| 6,584,644 | B2 | 7/2003 | Braid et al. |
| 6,606,761 | B2 | 8/2003 | Braid et al. |
| 6,622,342 | B1 | 9/2003 | Annes et al. |
| 6,679,000 | B2 | 1/2004 | Uken et al. |
| 6,763,550 | B2 | 7/2004 | Regnier |
| 6,820,368 | B2 | 11/2004 | Uken et al. |
| 6,840,011 | B2 | 1/2005 | Thompson et al. |
| 6,848,148 | B2 | 2/2005 | Braid et al. |
| 6,857,228 | B2 | 2/2005 | Kunz et al. |
| 6,860,066 | B2 | 3/2005 | Kunz et al. |
| 6,892,494 | B2 | 5/2005 | Malek |
| 6,931,788 | B2 | 8/2005 | Uken et al. |
| 6,934,998 | B1 | 8/2005 | Shuler |
| 6,983,513 | B2 | 1/2006 | Pettit |
| 6,990,710 | B2 | 1/2006 | Kunz et al. |
| 7,013,529 | B2 | 3/2006 | Pettit |
| 7,028,371 | B2 | 4/2006 | VerSteeg |
| 7,076,835 | B2 | 7/2006 | Harold et al. |
| 7,143,475 | B2 | 12/2006 | Annes et al. |
| 7,191,562 | B2 | 3/2007 | Uken et al. |
| 7,500,701 | B2 | 3/2009 | Lalancette |
| 7,552,510 | B2 | 6/2009 | Harold et al. |
| 7,568,260 | B2 * | 8/2009 | Wu .................... E05D 13/1207 49/181 |
| 7,587,787 | B2 | 9/2009 | Pettit |
| 7,673,372 | B2 | 3/2010 | Annes et al. |
| 7,703,175 | B2 | 4/2010 | Tuller |
| 7,735,191 | B2 | 6/2010 | Tuller |
| 7,937,809 | B2 | 5/2011 | Tuller |
| 7,945,994 | B2 | 5/2011 | Dallas et al. |
| 7,966,770 | B1 | 6/2011 | Kunz |
| 8,074,402 | B2 | 12/2011 | Tuller |
| 8,132,290 | B2 | 3/2012 | Liang et al. |
| 8,181,396 | B1 | 5/2012 | Kunz |
| 8,313,310 | B2 | 11/2012 | Uchikado |
| 8,365,356 | B2 | 2/2013 | Robertson |
| 8,371,068 | B1 | 2/2013 | Kunz |
| 8,424,248 | B2 | 4/2013 | Uken et al. |
| 8,505,242 | B1 | 8/2013 | Kunz |
| 8,539,642 | B2 | 9/2013 | Baker |
| 8,561,260 | B2 | 10/2013 | Baker et al. |
| 8,640,383 | B1 | 2/2014 | Kunz |
| 8,813,310 | B2 | 8/2014 | Baker et al. |
| 8,819,896 | B2 | 9/2014 | Kellum, III et al. |
| 8,850,745 | B2 | 10/2014 | Sofianek |
| 8,918,979 | B2 | 12/2014 | Baker |
| RE45,328 | E | 1/2015 | Tuller |
| 8,966,822 | B2 | 3/2015 | Sofianek et al. |
| 9,003,710 | B2 | 4/2015 | Kellum, III et al. |
| 9,121,209 | B2 | 9/2015 | Baker et al. |
| 9,133,656 | B2 | 9/2015 | Steen et al. |
| 9,334,683 | B1 | 5/2016 | Kunz |
| 9,458,655 | B2 | 10/2016 | deNormand |
| 9,476,242 | B2 | 10/2016 | Baker |
| 9,580,950 | B2 | 2/2017 | Uken et al. |
| 9,644,768 | B2 | 5/2017 | Skinner |
| 9,863,176 | B2 | 1/2018 | Kellum |
| 9,995,072 | B2 | 6/2018 | Baker |
| 10,081,972 | B1 | 9/2018 | Kunz |
| 10,174,537 | B1 | 1/2019 | Kunz |
| 10,208,517 | B2 | 2/2019 | Lucci et al. |
| 10,344,514 | B2 | 7/2019 | Uken |
| 10,415,287 | B1 | 9/2019 | Kunz |
| 10,533,359 | B2 | 1/2020 | Uken |
| 10,563,440 | B2 | 2/2020 | Kellum |
| 10,563,441 | B2 | 2/2020 | Kellum |
| 10,787,849 | B1 | 9/2020 | Guelck |
| 11,136,801 | B2 | 10/2021 | Kellum |
| 11,560,743 | B2 | 1/2023 | Steen |
| 2002/0053117 | A1 | 5/2002 | Braid et al. |
| 2002/0092241 | A1 | 7/2002 | Uken et al. |
| 2002/0104189 | A1 | 8/2002 | Braid et al. |
| 2002/0129463 | A1 | 9/2002 | Newman |
| 2003/0074764 | A1 | 4/2003 | Pettit et al. |
| 2003/0084614 | A1 | 5/2003 | Pettit |
| 2003/0192147 | A1 | 10/2003 | Braid et al. |
| 2003/0192257 | A1 | 10/2003 | Uken et al. |
| 2003/0213096 | A1 | 11/2003 | Annes et al. |
| 2003/0213661 | A1 | 11/2003 | VerSteeg |
| 2003/0226317 | A1 * | 12/2003 | Thompson .............. E05D 15/22 49/447 |
| 2004/0006845 | A1 | 1/2004 | Polowinczak et al. |
| 2004/0163209 | A1 | 8/2004 | Pettit |
| 2004/0163210 | A1 | 8/2004 | Malek |
| 2004/0168370 | A1 | 9/2004 | Pettit |
| 2004/0216380 | A1 | 11/2004 | Uken et al. |
| 2004/0237256 | A1 | 12/2004 | Lutfallah |
| 2004/0244158 | A1 | 12/2004 | Awakura et al. |
| 2004/0244295 | A1 | 12/2004 | Derham et al. |
| 2005/0016067 | A1 | 1/2005 | Pettit |
| 2005/0055802 | A1 | 3/2005 | Braid et al. |
| 2005/0091791 | A1 | 5/2005 | Kunz |
| 2005/0160676 | A1 | 7/2005 | Pettit |
| 2005/0178068 | A1 | 8/2005 | Uken et al. |
| 2005/0188620 | A1 * | 9/2005 | Malek ..................... E05D 15/22 49/181 |
| 2005/0198775 | A1 | 9/2005 | Pettit et al. |
| 2005/0229492 | A1 | 10/2005 | Robertson |
| 2005/0283944 | A1 | 12/2005 | Wu |
| 2006/0021283 | A1 | 2/2006 | Schultz |
| 2006/0086052 | A1 | 4/2006 | Petta et al. |
| 2006/0207185 | A1 | 9/2006 | Shuler et al. |
| 2006/0225363 | A1 | 10/2006 | Dallas et al. |
| 2007/0011846 | A1 | 1/2007 | Braid et al. |
| 2007/0101654 | A1 | 5/2007 | Robertson |
| 2007/0113479 | A1 | 5/2007 | Uken et al. |
| 2007/0209281 | A1 | 9/2007 | Flory |
| 2008/0000047 | A1 | 1/2008 | deNormand |
| 2008/0022728 | A1 | 1/2008 | Flory |
| 2008/0047099 | A1 | 2/2008 | Malek |
| 2008/0120804 | A1 | 5/2008 | Annes et al. |
| 2008/0178424 | A1 | 7/2008 | Tuller |
| 2008/0178425 | A1 | 7/2008 | Tuller |
| 2009/0188075 | A1 | 7/2009 | Baker |
| 2009/0260295 | A1 | 10/2009 | Tuller |
| 2010/0011669 | A1 | 1/2010 | Liang |
| 2010/0132263 | A1 | 1/2010 | Flory |
| 2010/0115854 | A1 | 5/2010 | Uken et al. |
| 2010/0269292 | A1 | 10/2010 | Liang |
| 2011/0067314 | A1 | 3/2011 | Baker |
| 2011/0239402 | A1 | 10/2011 | Steen et al. |
| 2012/0297687 | A1 | 11/2012 | Baker et al. |
| 2013/0283699 | A1 | 10/2013 | Kellum, III et al. |
| 2013/0340349 | A1 | 12/2013 | Baker |
| 2014/0000172 | A1 | 1/2014 | Sofianek |
| 2014/0026490 | A1 | 1/2014 | Baker et al. |
| 2014/0208653 | A1 | 7/2014 | Sofianek et al. |
| 2014/0208655 | A1 | 7/2014 | Stoakes et al. |
| 2014/0259524 | A1 | 9/2014 | Kellum, III et al. |
| 2014/0259936 | A1 | 9/2014 | DeNormand et al. |
| 2014/0331561 | A1 | 11/2014 | Baker et al. |
| 2015/0167379 | A1 | 6/2015 | Sofianek et al. |
| 2015/0361701 | A1 | 12/2015 | Steen et al. |
| 2015/0368952 | A1 | 12/2015 | Baker et al. |
| 2016/0222709 | A1 | 8/2016 | Wynder |
| 2016/0298368 | A1 | 10/2016 | Kunz |
| 2016/0298369 | A1 | 10/2016 | Kunz |
| 2017/0089109 | A1 | 3/2017 | Steen et al. |
| 2017/0145722 | A1 | 5/2017 | Kellum, III |
| 2017/0211305 | A1 | 7/2017 | Uken et al. |
| 2017/0292303 | A1 | 10/2017 | Lucci |
| 2017/0370138 | A1 | 12/2017 | Uken et al. |
| 2018/0261660 | A1 | 10/2018 | Kellum |

(56) References Cited

U.S. PATENT DOCUMENTS

| | | | | |
|---|---|---|---|---|
| 2018/0291660 | A1 | 10/2018 | Kellum | |
| 2019/0003228 | A1* | 1/2019 | Seiling | E05D 15/406 |
| 2019/0085609 | A1 | 3/2019 | Kellum | |
| 2020/0018105 | A1* | 1/2020 | McDuff | E05D 15/165 |
| 2020/0040630 | A1 | 2/2020 | Newman | |
| 2020/0157863 | A1 | 5/2020 | Kellum | |
| 2020/0217116 | A1 | 7/2020 | Kellum | |
| 2020/0224472 | A1 | 7/2020 | Uken | |
| 2020/0318408 | A1 | 10/2020 | Steen | |
| 2021/0156181 | A1* | 5/2021 | Welbig | E05D 15/48 |
| 2021/0164278 | A1 | 6/2021 | Steen | |
| 2021/0246697 | A1 | 8/2021 | Kellum | |
| 2022/0034138 | A1 | 2/2022 | Kellum | |

FOREIGN PATENT DOCUMENTS

| | | | | |
|---|---|---|---|---|
| CA | 2382933 | | 4/2002 | |
| CA | 2338403 | | 4/2006 | |
| CA | 2596293 | | 2/2008 | |
| CA | 2619267 | | 7/2008 | |
| CA | 2619289 | | 7/2008 | |
| CA | 2820240 | | 1/2014 | |
| CA | 2836375 | | 7/2014 | |
| CA | 2974594 | | 1/2018 | |
| CN | 1430693 | A | 7/2003 | |
| CN | 101463697 | A | 6/2009 | |
| CN | 106715814 | A | 5/2017 | |
| DE | 4211695 | | 10/1992 | |
| GB | 329996 | | 5/1930 | |
| GB | 723056 | | 2/1955 | |
| GB | 740223 | | 11/1955 | |
| GB | 1505782 | | 3/1978 | |
| GB | 2195691 | | 4/1988 | |
| GB | 2236786 | | 4/1991 | |
| GB | 2254875 | | 10/1992 | |
| GB | 2276655 | | 10/1994 | |
| GB | 2278626 | | 12/1994 | |
| GB | 2280697 | | 2/1995 | |
| GB | 2292168 | | 2/1996 | |
| GB | 2295634 | | 6/1996 | |
| GB | 2298892 | A * | 9/1996 | E06B 3/44 |
| GB | 2387409 | | 10/2003 | |
| JP | 56-171982 | | 12/1981 | |
| JP | 63-3785 | | 1/1988 | |
| JP | 03197785 | | 8/1991 | |
| JP | 5-52273 | | 7/1993 | |
| JP | 3025244 | | 6/1996 | |
| JP | 2000283025 | | 10/2000 | |
| JP | 2002242527 | A * | 8/2002 | |
| JP | 2004293388 | | 10/2004 | |
| JP | 2005113907 | | 4/2005 | |
| TW | 201518594 | A | 5/2015 | |

OTHER PUBLICATIONS

Balance Systems—BSI Amesbury Group, Inc. Crossbow Balance Advertisement dated Jun. 7, 1999 (3 pgs.).

BSI Tilt Balance Systems, Balance Systems—BSI, Amesbury Group, Inc., 1996-2001, 4 pgs.

BSI's Hidden Advantage: It's as Easy as 1-2-3, Balance Systems—BSI, Amesbury Group, Inc., 2001, 3 pgs.

Response by Patent Owner to Office Action in Ex-Parte Re-Examination Pursuant to 37 C.F.R. 1.550(e) for co-pending U.S. Appl. No. 90/013,695, filed Aug. 23, 2016, 13 pages.

Crossbow Balance! Another New Balance in BSI's Quiver, Balance Systems—BSI, Amesbury Group, Inc., Jun. 7, 1999, 2 pgs.

Dakota Balance—Balances and Accessories brochure, May 2001, 2 pgs.

DWM Door & Window Maker Magazine, "2004 Annual Buyers Guide", vol. 5, Issue 3, Apr. 2004, 2 pgs.

Ex-Parte Re-Examination Office Action for corresponding Re-Examination U.S. Appl. No. 90/013,695 mailed Jun. 23, 2016, 8 pgs.

Heinberg, "Latest Trends in Window and Door Hardware," Shelter Magazine, Jul. 2001, cover and p. 11.

PCT International Preliminary Report on Patentability in Application PCT/US2018/026500, mailed Oct. 17, 2019, 7 pages.

PCT International Search Report and Written Opinion in International Application PCT/US2018/026500, mailed Jun. 22, 2018, 13 pages.

PCT International Search Report, Written Opinion, and International Preliminary Report on Patentability (with 37 sheets of annexes) for PCT/US2011/024134; ISA/US, Feb. 9, 2011 (113 pages total).

Photographs of the Crossbow Balance Component shown in C6 (7 views; 3 pgs).

* cited by examiner

WINDOW BALANCE SYSTEMS

CROSS-REFERENCE TO RELATED APPLICATIONS

This application is a continuation of U.S. patent application Ser. No. 16/838,175, now U.S. Pat. No. 11,560,743, filed Apr. 2, 2020, and titled "WINDOW BALANCE SYSTEMS", which claims priority to and the benefit of U.S. Provisional Patent Application No. 62/828,208, filed Apr. 2, 2019, and titled "WINDOW BALANCE SYSTEM HAVING LOCKING CORD," and U.S. Provisional Patent Application No. 62/869,848, filed Jul. 2, 2019, and titled "WINDOW BALANCE WITH CHANNEL-ENGAGED PIVOT BAR," the disclosures of which are hereby incorporated by reference herein in their entireties.

INTRODUCTION

Pivotable double hung windows can include two window sashes disposed in tracks located in a window frame to allow vertical sliding movement of the sashes. Pivot bars are provided to allow rotational movement of a pivotable window sash about the pivot bars to facilitate cleaning and/or removal of the sash. To control vertical movement, window balance systems are used so that the window sashes remain in a position in which they are placed. Balance shoes can be used to guide the rotational movement of the window sashes with respect to the window frame.

SUMMARY

In an aspect, the technology relates to a window balance system including: a U-shaped channel including a first end and an opposite second end; a balance element supported at least partially within the U-shaped channel and configured to generate a balancing force for a window sash, wherein the balance element includes: a fixed pulley block coupled to the first end of the U-shaped channel; a movable pulley block movably disposed in the U-shaped channel; and a cord extending between the fixed pulley block and the movable pulley block; a locking device coupled to the fixed pulley block and configured to engage with the cord and lock a position of the fixed pulley block with respect to the cord; and a shoe coupled to the second end of the U-shaped channel, wherein the shoe includes an elongate portion and an enlarged portion such that the shoe is substantially T-shaped, and a chamber configured to receive at least a portion of a pivot bar.

In an example, the locking device includes a rotatable pawl that is biased to engage the cord with one or more teeth disposed on the pawl. In another example, the U-shaped channel includes a base wall and a plurality of walls, and wherein proximate the shoe, the base wall includes: a receiver at least partially defining a throat and an opening, wherein the opening is configured to receive and directly contact the pivot bar; and a groove terminating proximate the receiver, wherein the opening is disposed proximate a first end of the groove, and wherein the receiver and the groove at least partially define a separation therebetween.

In another aspect, the technology relates to a window balance system including: a balance element configured to generate a balancing force for a window sash, wherein the balance element includes a flexible cord; a balance channel that supports at least a portion of the balance element; and a locking device coupled to the balance channel, wherein the locking device is movable between a locked configuration and an unlocked configuration, wherein in the locked configuration, the locking device engages with the cord such that movement of the cord relative to the locking device is prevented, and wherein the locking device is biased to rotate towards the locked configuration.

In an example, the locking device includes a rotatable pawl that engages with the cord when in the locked configuration. In another example, the pawl includes at least one tooth. In yet another example, the pawl includes an actuator arm. In still another example, the actuator arm is biased by a compression spring. In an example, the balance element includes a pulley housing fixed to the balance channel, and the locking device is supported on the pulley housing.

In another example, when the locking device is in the locked configuration, the cord is compressed between the pawl and the pulley housing. In yet another example, the pulley housing includes one or more exterior shoulders extending in a direction that is substantially orthogonal to a longitudinal axis of the balance channel. In still another example, the balance channel comprises a U-shaped channel having a longitudinal axis, a base wall, and a plurality of walls, and a rotation axis of the pawl is substantially orthogonal to the longitudinal axis.

In another aspect, the technology relates to a window balance system including: a U-shaped channel including a base wall and a plurality of walls extending from the base wall, wherein the base wall defines: a receiver at least partially defining a throat and an opening, wherein the opening is configured to receive and directly contact a pivot bar; and a groove terminating proximate the receiver, wherein the opening is disposed proximate a first end of the groove, and wherein the receiver and the groove at least partially define a separation therebetween; a balance element supported at least partially within the U-shaped channel and configured to generate a balance force for a window sash; and a shoe configured to couple to the U-shaped channel proximate the receiver, wherein the shoe includes a chamber that aligns with the first end of the groove of the U-shaped channel and receive at least a portion of the pivot bar.

In an example, the shoe further includes an elongate portion and an enlarged portion such that the shoe is substantially T-shaped, and the elongate portion is disposed at least partially within the U-shaped channel when the shoe is coupled to the U-shaped channel. In another example, a hook slot is defined within the elongate portion and is defined on the same side of the shoe as the chamber. In yet another example, at least one slot is defined in the enlarged portion proximate the elongate portion, and the at least one slot has a projection configured to engage with an end of the plurality of walls. In still another example, the end of the plurality of walls define a notch configured to receive the projection of the shoe. In an example, the enlarged portion has two opposing end surfaces and a bottom surface, and all of the end surfaces and the bottom surface are curved.

In another example, the shoe is a unitary component having no moving parts. In yet another example, the balance element is a block and tackle balance system.

BRIEF DESCRIPTION OF THE DRAWINGS

There are shown in the drawings, examples that are presently preferred, it being understood, however, that the technology is not limited to the precise arrangements and instrumentalities shown.

DETAILED DESCRIPTION

Figure 1:
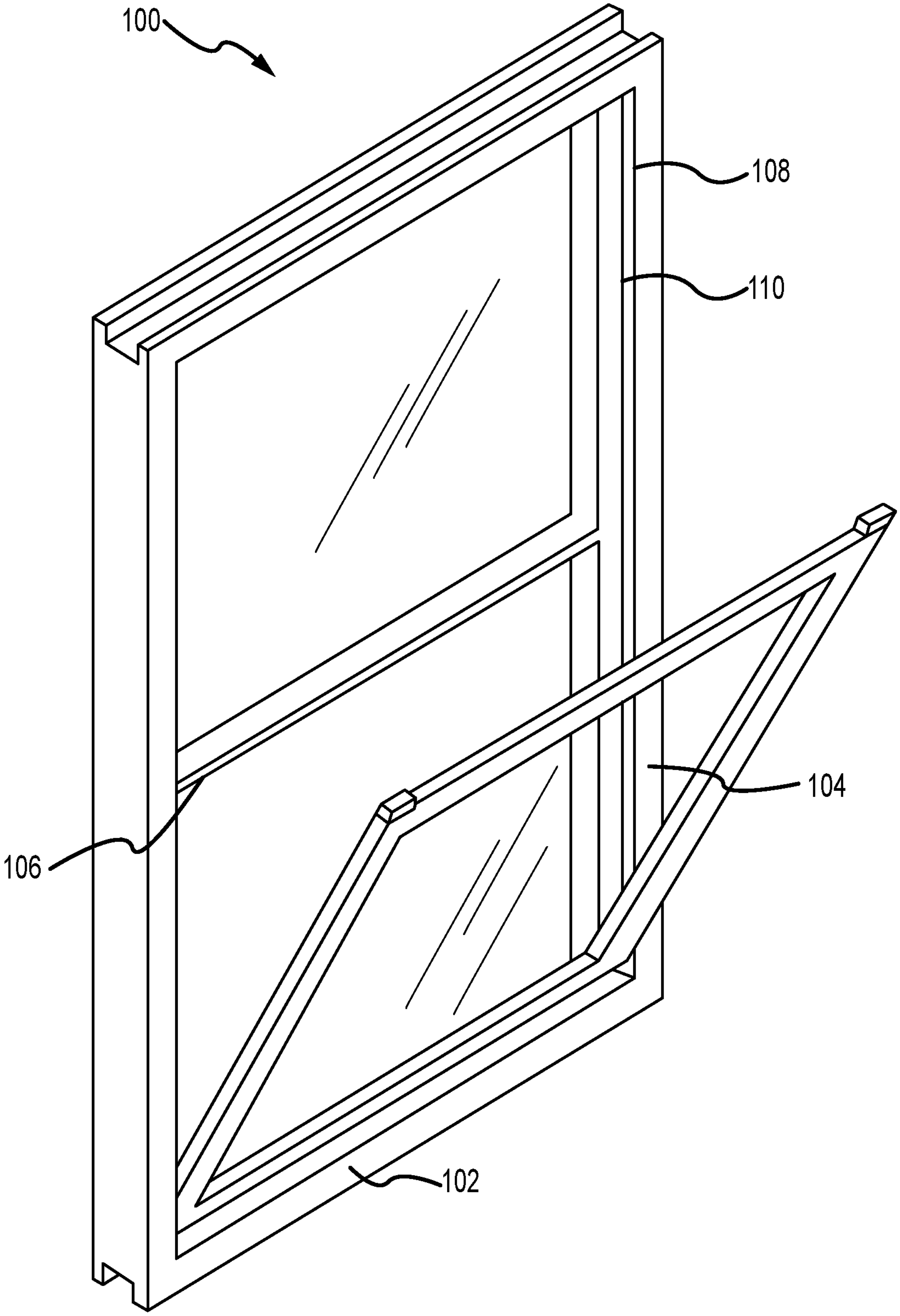
FIG. 1 is a perspective view of a pivotable double hung window assembly.

FIG. 1 is a perspective view of a pivotable double hung window assembly 100 for which a window balance system as described herein may be used. The pivotable double hung window assembly 100 includes a window frame 102, a pivotable lower window sash 104, a pivotable upper window sash 106, and a window jamb 108. The pivotable lower window sash 104 and the pivotable upper window sash 106 slide vertically in a jamb track 110 within the window jamb 108, while also being able to pivot about a pivot bar 116 (shown in FIGS. 4 and 5). In other examples, the window assembly 100 may be a single hung window assembly in which only the lower window sash 104 is pivotable and slidable. A window balance system, for example, the window balance systems shown and described herein, are used to couple the window sash 104, 106 to the window frame 102 and enable the pivotable and slidable movement of the window sash, while also generating a balancing force for operation of the window sash.

Prior art window balance systems typically include a U-shaped channel containing therein a block and tackle window balance system (including a movable pulley block, a fixed pulley block, a cord extending therebetween, and a spring), a shoe connected to the channel, and a cam disposed in the shoe. A pivot bar from the associated sash extends into a keyhole in the cam. Examples of a number of window balance systems are depicted in U.S. Pat. No. 6,679,000, the disclosure of which is hereby incorporated by reference herein in its entirety. The cam is rotatably disposed in the shoe such that rotation thereof (due to tilting of the associated window sash) may extend one or more locking elements from the shoe. Once extended, the locking elements engage with surfaces of the window jamb channel and hold the window balance system in place, where the force of the locking elements act against the force of the spring. When the shoe is not locked in place, the force of the spring acts against the weight of the window, as transmitted through the pivot bar, cam, and shoe.

In some examples, the competing forces of the spring against the locking elements (if tilted) or the spring against the weight of the window sash (if un-tilted) may cause a separation of the shoe from the U-shaped channel. This may be due to an insufficiently robust connection between the channel (typically made of stamped metal) and the shoe (made of molded plastic). The plastic shoe may separate from the channel or break at the point of connection. This separation may damage the window and necessitate replacement of the window balance system. Additionally, the locking element typically frictionally engages with the surface(s) of the window jamb channel to hold the window sash in place, and as such, may be limited for use with heavy window sashes, as well as, undesirably retract when engaging surfaces are worn.

The technologies described herein are related to window balance systems that utilize a locking device that selectively engages with a flexible cord to lock the balance in place during tilting of the window sash. The locking device includes a rotatable pawl that can be positioned in an unlocked position and a locked position. In the unlocked position, the pawl is moved away from the cord by the position of the window sash so that the window balance can provide a balance force during sliding operation of the window sash without interference on the cord. In the locked position, the pawl is configured to compress the cord so as to prevent the cord from retracting into the window balance and maintain the position of the window balance within the window jamb. The locking device is biased so as to automatically move towards the locked position when the window sash is tilted. Furthermore, the rotation of the pawl is in a substantially similar direction to the retraction direction of the cord so that the retraction force of the window balance assists in providing the compression force on the cord. This is a more robust connection and reduces or eliminates the likelihood of undesirable retraction of the window balance system.

Additionally, the technologies described herein increase the holding strength of a window balance system by directly connecting the metal U-shaped channel to the pivot bar, which is also made of metal (e.g., zinc) or robust plastics (e.g., glass-reinforced polyphthalamide). The force of the spring in the U-shaped channel is transmitted directly to the pivot bar. This is a more robust connection than prior configurations that utilized a pivot bar inserted into a balance shoe and a cam that was connected to the U-shaped channel. In examples, contact between the pivot bar and channel may be direct metal-to-metal, or reinforced plastic-to-metal via a shoe. Such configurations may reduce or eliminate the likelihood of failure of the window balance system. The shoe is connected to the U-shaped channel proximate the pivot bar location to reduce or eliminate lateral movement of the window balance system within the window jamb. In examples, the channel and shoe configuration herein may be used in conjunction with a window balance having a locking cord to prevent movement of the window balance when the associated window sash is pivoted. Examples of window balance systems incorporating the proposed technology are described below.

Figure 2:
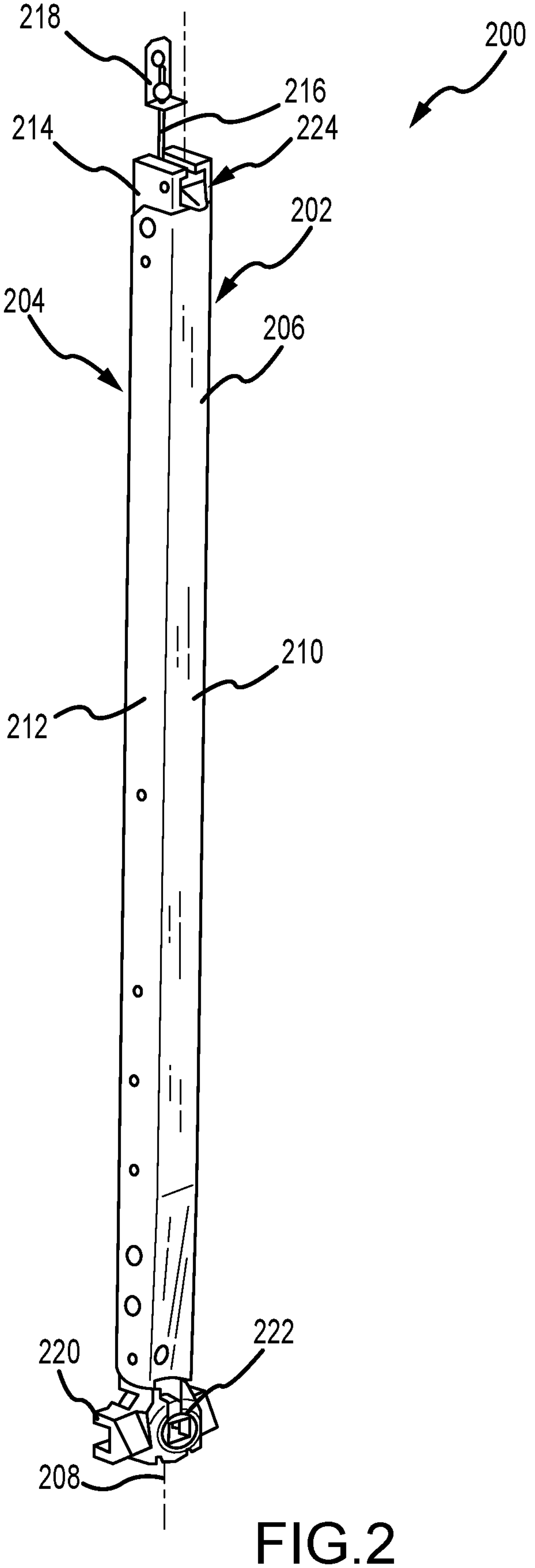
FIG. 2 is a perspective view of an exemplary block and tackle window balance system.

FIG. 2 is a perspective view of an exemplary block and tackle window balance system 200 that may be used in the window assembly 100 (shown in FIG. 1). The window balance system 200 includes a balance housing 202 that supports a balance element 204 configured to generate a balancing force for the window sash within the window frame. In the example, the balance housing 202 includes a rigid U-shaped channel 206 having a longitudinal axis 208, a base wall 210, and two opposing walls 212. The balance element 204 is disposed at least partially within the channel 206 and includes an extension spring (not shown) connected to a system of pulleys 214 (e.g., a translatable pulley and a fixed pulley). A flexible cord 216 connects the system of pulleys 214 to a jamb mounting attachment 218, such as a cord terminal or hook.

Opposite the jamb mounting attachment 218, a shoe 220 may be coupled to the balance housing 202 such that it is at least partially disposed within the U-shaped channel 206. As illustrated, the shoe 220 supports a rotatable cam 222 that is configured to receive the pivot bar 116 (shown in FIGS. 4 and 5) of the pivotable window sash so that when the sash is tilted open, the pivot bar rotates, thereby rotating the cam 222. In an aspect, the shoe 220 may be similar to that disclosed in U.S. Pat. No. 6,679,000. In other aspects, the shoe 220 may be the shoes described further herein, and for example, in FIGS. 15-17 and 27-30, and the cam 222 is not necessarily required or desired.

In the example, the window balance 200 also includes a locking device 224 that is coupled to the balance housing 202 and opposite of the shoe 220. The locking device 224 is configured to selectively engage with the cord 216 so as to lock the window balance system 200 in place and allow the window sash to be tilted and/or removed. The locking device 224 is described further below in reference to FIGS. 6 and 7.

Although the window balance system 200 is illustrated and described as a block and tackle-type window balance, the locking devices and/or shoes described herein may be used for any other type of window balance system as required or desired. For example, in a constant force-type balance system, the locking device may selectively engage with the coil spring such that retraction of the coil spring is prevented. In another example, in a constant force-type balance system, the shoe may directly engage with the pivot bar so as to increase the connection strength thereof.

In examples when the shoe 220 is similar to that disclosed in U.S. Pat. No. 6,679,000, the shoe 220 may also support a locking element (not shown). The locking element can be coupled to the cam 222 such that upon rotation of the cam 222, a portion of the locking element is extended from the shoe 220 so as to engage with the window jamb. This engagement can also lock the window balance 200 within the window frame. However, these other locking mechanisms (e.g., on the shoe 220) are not required because of the locking device 224 described herein, but nevertheless may be used as a redundant locking system on the window balance 200 as required or desired. As such, the locking device 224 can be used independently in the window balance system 200 regardless of the shoe utilized. In examples when the shoe does not include a cam or locking element (e.g., FIGS. 15-17 and 27-30), the shoe includes various features that increase the strength of the shoe, the channel, and engagement with the pivot bar for the window balance system 200. Similar to the locking device 224, these shoes can be used independently in the window balance system 200 regardless of the locking device utilized that lock the position of the window balance 200 (if a locking device is present in the system at all). Accordingly and as described herein, the window balance systems 200 can include both the locking devices 224 and the shoes described herein, or only one of the locking devices 224 or the shoes as the components can be independent within various configurations the window balance systems.

Figure 3:
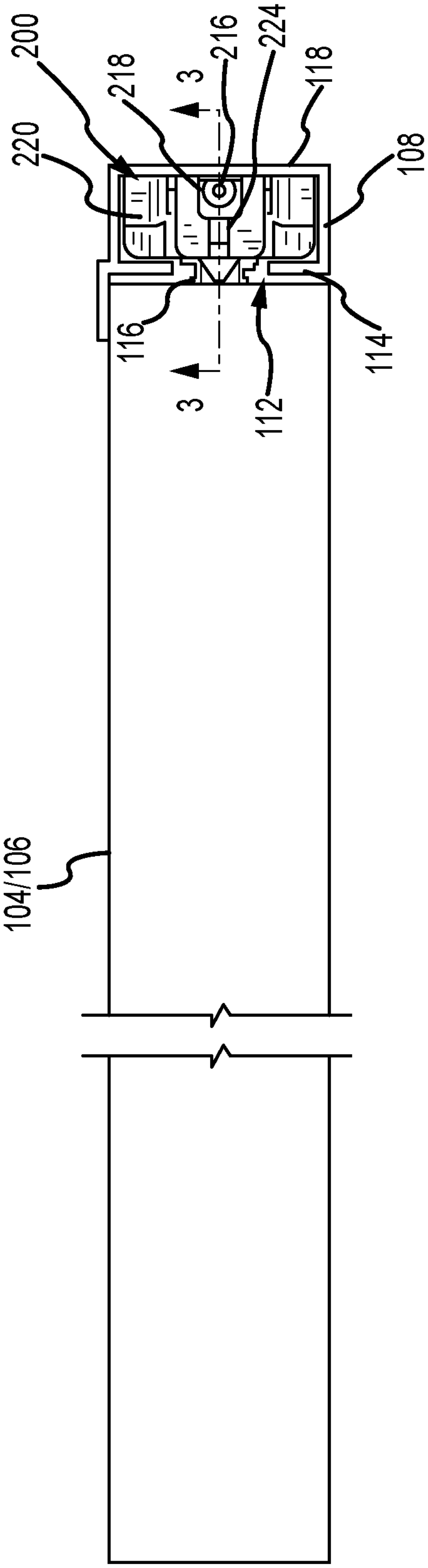
FIG. 3 is a top view of the window balance system mounted within a window jamb.

FIG. 3 is a top view of the window balance system 200 mounted within the window jamb 108. In the example, the locking device 224 is positioned at the top of the U-shaped channel 206 (shown in FIG. 2), while the shoe 220 is positioned at the bottom of the U-shaped channel 206. However, the locking device 224 may be disposed at any other location on the window balance system 200 that enables the window balance to function as described herein. As illustrated in FIG. 3, the window jamb 108 is substantially C-shaped with an elongated slot 112 defined in a front wall 114 thereof. The window sash 104, 106 is positioned adjacent to the front wall 114 of the window jamb 108 when mounted in the window frame. The window sash 104, 106 includes a pivot bar 116 that extends through the elongated slot 112 of the window jamb 108 so as to removably couple the window sash to the window balance system 200. The jamb mounting attachment 218 is fixed within the window jamb 108, for example, on a back wall 118 of the window jamb 108 and secures a free end of the cord 216.

In operation, the locking device 224 is movable between an unlocked configuration (shown in FIG. 4) and a locked configuration (shown in FIG. 5) based on the position of the window sash 104, 106. Accordingly, when the window sash 104, 106 is covering the elongated slot 112 of the window jamb 108 (as also illustrated in FIG. 3), the locking device 224 is engaged with the window sash, and thus, positioned in the unlocked configuration such that the cord 216 is free to operate as normal. This configuration enables the U-shaped channel 206 and the shoe 220 to slide within the window jamb 108 and the window balance 200 to provide a balance force to the window sash 104, 106 during this movement. When the window sash 104, 106 is tilted away from the elongated slot 112 of the window jamb 108, the locking device 224 is no longer held in the unlocked configuration by the window sash, and thus, moves towards the locked configuration such that the cord 216 is engaged and the window balance 200 is locked in place. This configuration prevents movement of the cord 216 relative to the locking device 224 so that the U-shaped channel 206 and the shoe 220 do not undesirably retract towards the jamb mounting attachment 218.

Figure 4:
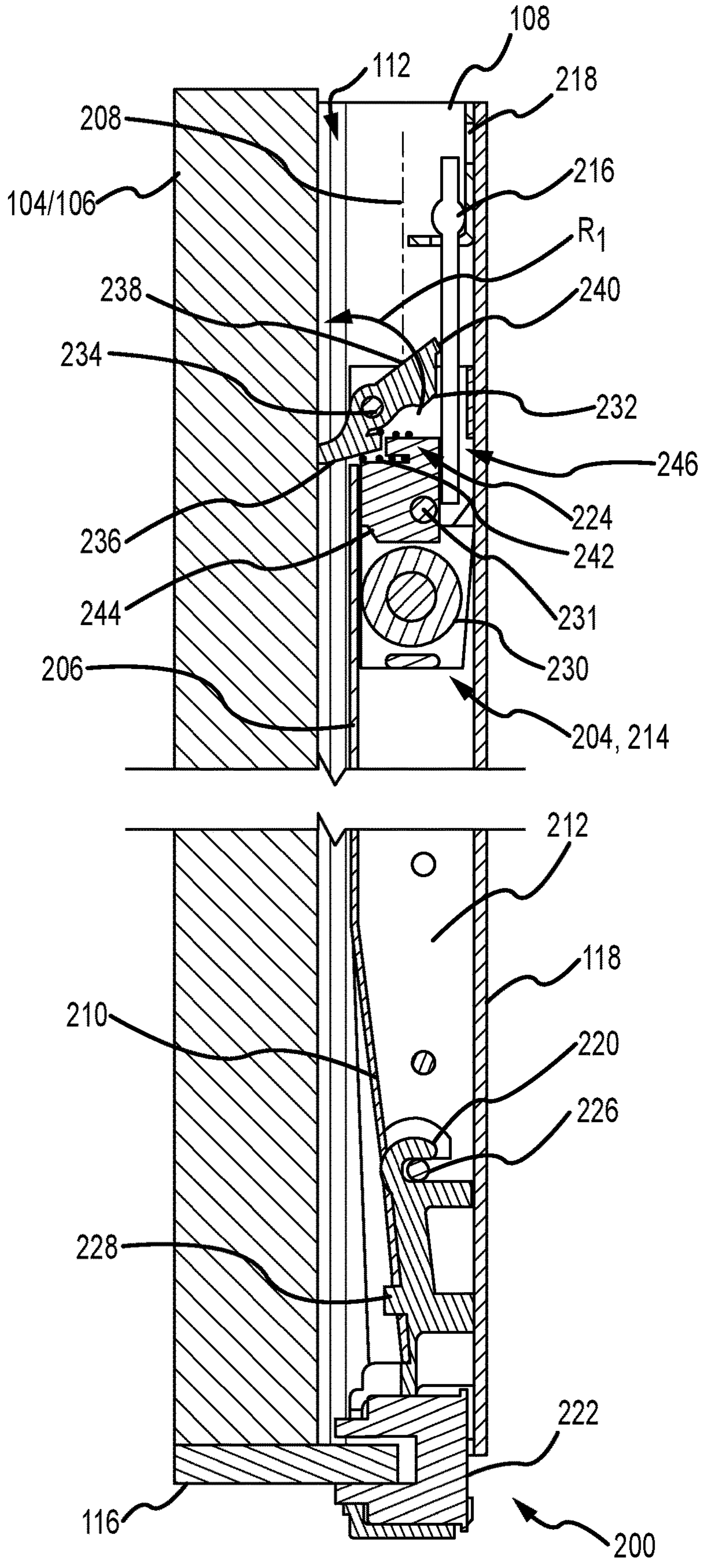
FIG. 4 is a cross sectional view of the window balance system shown in FIG. 3 taken along 3-3 and in an unlocked configuration.

FIG. 4 is a cross sectional view of the window balance system 200 shown in FIG. 3 taken along 3-3 and in an unlocked configuration. Certain components are described above, and thus, are not necessarily described further. In the unlocked configuration, the window sash 104, 106 is mounted within the window frame so that it is substantially aligned with the window jamb 108. As illustrated in FIG. 4, the window sash 104, 106 is supported within the window frame by the window balance 200 via the pivot bar 116 extending through the elongated slot 112 and into the rotatable cam 222. The cam 222 is disposed within the shoe 220 that is coupled to the U-shaped channel 206 at a rivet 226. In some examples, a protrusion 228 of the shoe 220 may be coupled to the base wall 210 of the channel 206.

In the example, the U-shaped channel 206 houses the balance element 204 that includes a spring, a system of pulleys 214 that has a translatable pulley and a fixed pulley 230 that is coupled to the channel 206 by a rivet 231, and the cord 216 that wraps through the system of pulleys 214. The spring, the translatable pulley, and the cord 216 wrapping around the system of pulleys 214 are not illustrated in FIG. 4 for clarity, but are disposed between the shoe 220 and the fixed pulley 230 as known with block and tackle-type balance systems. The free end of the cord 216 extends out of the top of the fixed pulley 230 so as to be secured to the window jamb 108, for example, at the jamb mounting attachment 218. The U-shaped channel 206 can be oriented so that the base wall 210 is spaced away from the back wall 118 of the jamb 108 so that the components of the balance element 204 can be covered and reduce dirt and debris accumulation thereon.

The locking device 224 is disposed at the top of the U-shaped channel 206 and includes a rotatable pawl 232 that selectively engages with the cord 216, and when in the unlocked configuration, is disengaged from the cord 216. The pawl 232 is rotatably supported by an axle 234 that defines the rotational axis of the pawl 232. In the example, the axle 234 extends in a direction that is substantially orthogonal to the longitudinal axis 208 of the U-shaped channel 206. The pawl 232 includes an actuator arm 236 and an opposite cord engagement arm 238 that can have one or more teeth 240 extending therefrom. The actuator arm 236 is coupled to a biasing element 242. The axle 234 and the biasing element 242 are supported by a locking device housing 244 that is coupled to the top of the U-shaped channel 206. In the example, the locking device housing 244 is integral with and supported by the fixed pulley 230, and as such, the cord 216 extends through an opening 246 within the housing 244. In other examples, the locking device housing 244 may be independent and separate from the fixed pulley 230 as required or desired.

The axle 234 of the locking device 224 is positioned proximate the base wall 210 of the U-shaped channel 206, and the elongated slot 112 of the jamb 108, when the window balance 200 is mounted therein. This location of the axle 234 extends the actuator arm 236 out from elongated slot 112 so that the actuator arm 236 can contact and engage with a portion of the window sash 104, 106. In the unlocked configuration of the locking device 224 illustrated in FIG. 4, the window sash 104, 106 covers the elongated slot 112 and engages with the actuator arm 236 so that the arm 236 is depressed at least partially within the locking device housing 244 and into the window jamb 108 by overcoming the biasing force of the biasing element 242. This movement of the actuator arm 236 rotates $R_1$ the cord engagement arm 238 away from the cord 216, for example, positioning the tooth 240 away from the cord 216. Thus, allowing the cord 216 to extend and retract from the U-shaped channel 206 and freely pass through the locking device housing 244 without being engaged by the pawl 232. As such, when the locking device 224 is in the unlocked configuration, the window balance 200 is enabled for sliding movement of the window sash 104, 106 and to provide a balancing force.

Figure 5:
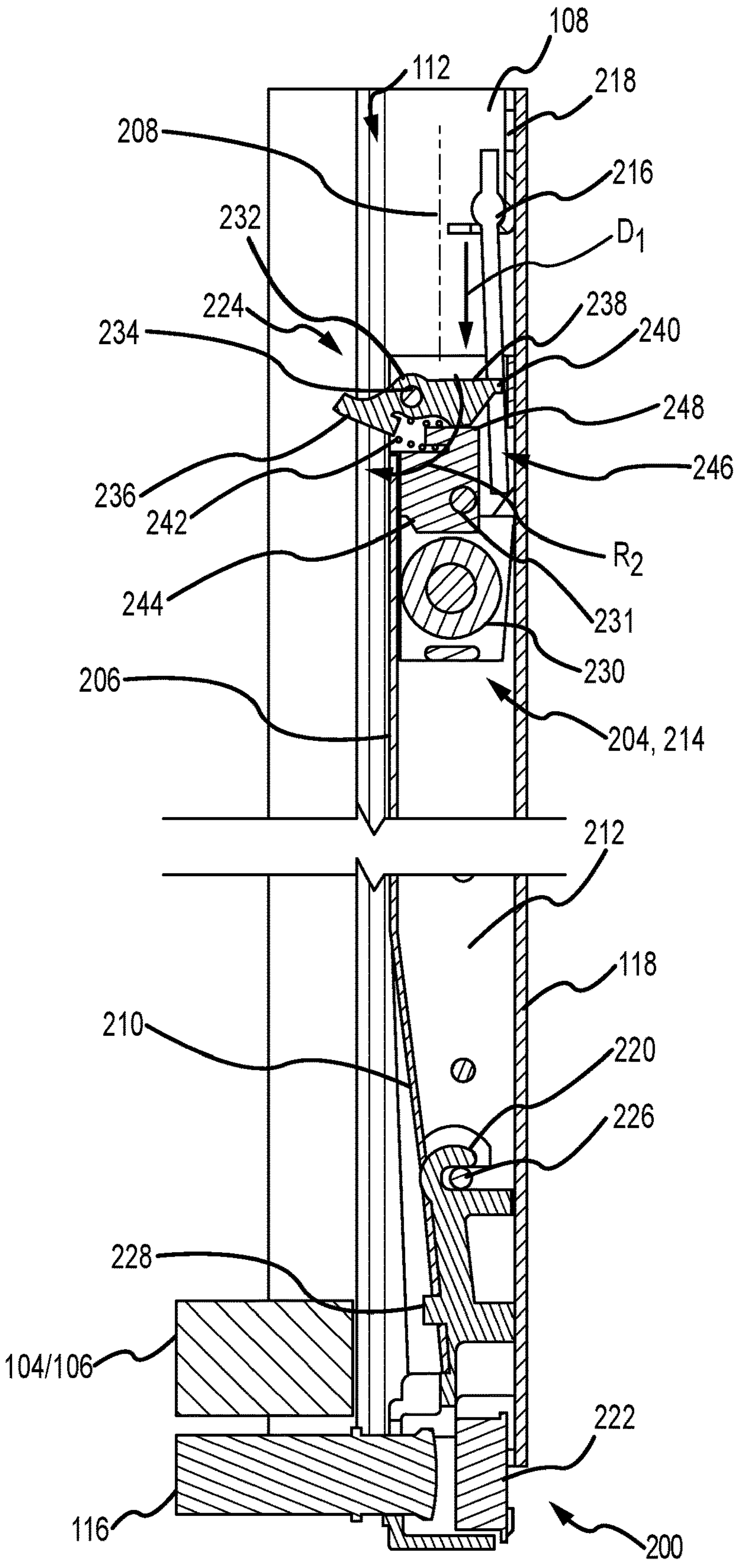
FIG. 5 is a cross sectional view of the window balance system shown in FIG. 3 taken along 3-3 and in a locked configuration.

FIG. 5 is a cross sectional view of the window balance system 200 shown in FIG. 3 taken along 3-3 and in a locked configuration. Certain components are described above, and thus, are not necessarily described further. In the locked configuration, the window sash 104, 106 is tilted out of the window frame and away from the window jamb 108, or completely removed from the window frame. This tilting and/or removal operation of the window sash 104, 106 is enabled by the shoe 220 and the cam 222 via the pivot bar 116. Additionally, when the window sash 104, 106 is tilted or removed out of the window frame, the weight of the window sash is removed from the window balance 200, thereby causing the balance element 204 to retract towards the free end of the cord 216 and the jamb mounting attachment 218. When the locking device 224 is in the locked configuration, the retraction movement of the window balance 200 is prevented so that the window balance 200 can hold in place within the window jamb 108 at the location that the window sash 104, 106 is removed. This location within the window jamb 108 may have the balance element 204 at least partially extended such that a residual balance force is generated within the balance element 204 and that needs to be resisted by the locking device 224.

When the window sash 104, 106 is tilted out of the window jamb 108, the window sash uncovers the elongated slot 112, and thereby, disengages from the locking device 224. Upon disengagement from the window sash 104, 106, the locking device 224, and more specifically, the pawl 232, automatically rotates $R_2$ towards the locked configuration and the cord engagement arm 238 engages with the cord 216. In the example, the biasing element 242 biases the pawl 232 such that the locking device 224 is automatically biased to rotate towards the locked configuration. The biasing element 242 may be a compression spring coupled to the actuator arm 236 and as illustrated in FIG. 5. In another aspect, the biasing element 242 can be a tension or a torsion spring that is coupled to the axle 234. In the locked configuration, the actuator arm 236 is biased to extend at least partially out of the elongated slot 112 of the jamb 108 so that the window sash 104, 106 can be used to move the locking device 224 back towards the unlocked configuration. Additionally, this position of the actuator arm 236 enables a user to easily manipulate the locking device 224, for example, during manual positioning of the window balance 200 and/or removal of the window balance 200 from the window jamb 108.

In the locked configuration, as the cord engagement arm 238 rotates $R_2$ towards the cord 216, the cord engagement arm 238 frictionally engages with and compresses the cord 216 to prevent retraction of the cord. This rotation direction $R_2$ is substantially similar to the retraction direction $D_1$ of the cord 216 (e.g., into the U-shaped channel 206 and through the locking device 224) so that the cord engagement arm 238 is further pulled into the locked configuration when engaged with the cord 216. The locking device housing 244 provides a rotation stop 248 for the pawl 232 so that the cord engagement arm 238 can compress the cord 216 in the locked configuration without being pulled out of engagement. Additionally, in this example, the cord 216 extends adjacent to the back wall 118 of the window jamb 108 while extending through the locking device housing 244.

In the example, when the window sash 104, 106 tilts at least 3° about a pivot bar axis defined by the pivot bar 116, the pawl 232 rotates towards the locked configuration and engages with the cord 216. In other examples, the window sash 104, 106 may tilt as little as 1° about the pivot bar axis to facilitate movement of the locking device 224 toward the locked configuration. In still other examples, the window sash 104, 106 may tilt between 1° and 25° to facilitate movement of the locking device 224 toward the locked configuration. In yet other examples, the window sash 104, 106 may tilt about 3.5° to facilitate movement of the locking device 224 toward the locked configuration. Additionally or alternatively, a post member (not shown) may be coupled to, and extend from, the window sash 104, 106 so as to further facilitate engagement with the pawl 232 and at least partially control the tolerance of the locking device 224 being moved towards the locked configuration. By reducing the amount of tilting movement required by the window sash 104, 106 to engage the locked configuration of the locking device 224, the quicker the locking device 224 moves toward the locked configuration when tilted to reduce undesirable retraction of the cord 216.

Figure 7:
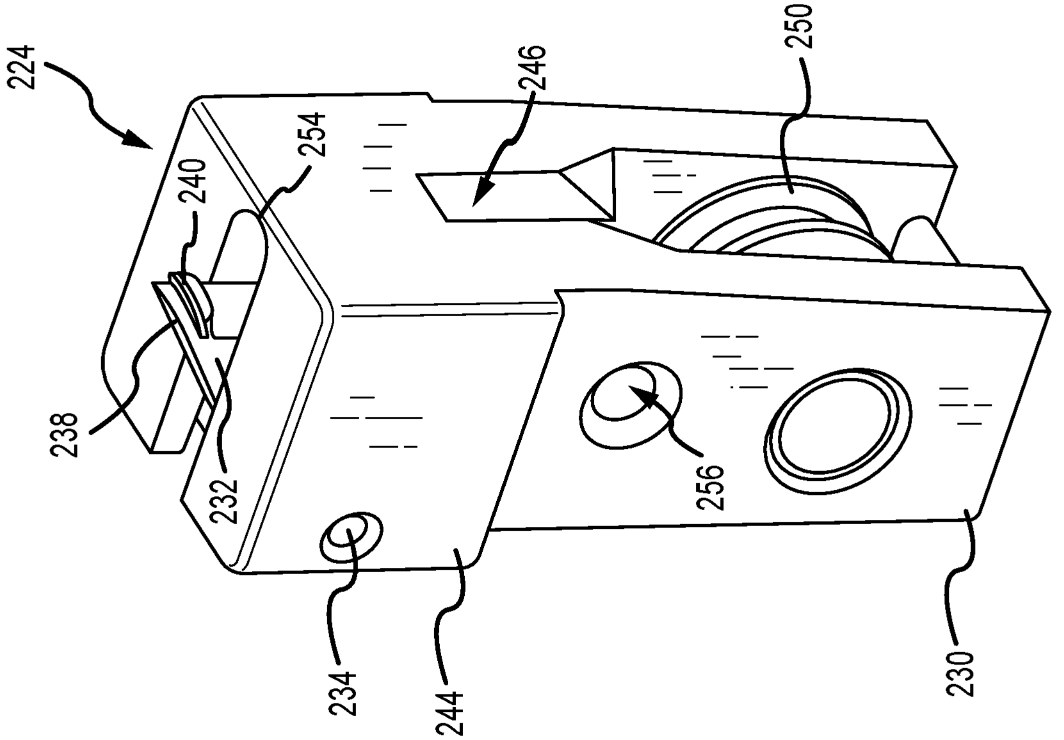
FIG. 7 is another perspective view of the locking device shown in FIG. 6.
Figure 6:
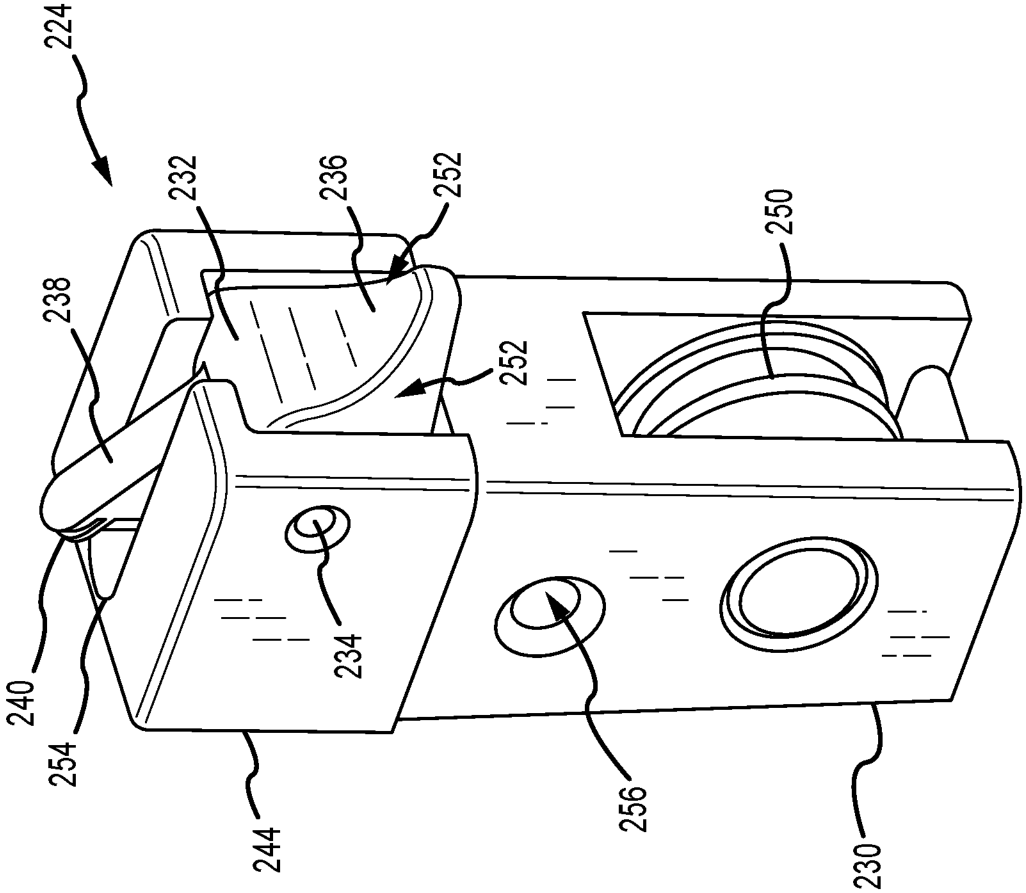
FIG. 6 is a perspective view of a locking device of the window balance system shown in FIGS. 2-5.

FIG. 6 is a perspective view of the locking device 224 of the window balance system 200 (shown in FIGS. 2-5). FIG. 7 is another perspective view of the locking device 224. Referring concurrently to FIGS. 6 and 7, the locking device housing 244 extends from the fixed pulley 230 that is sized and shaped to be received within the U-shaped channel 206 (shown in FIGS. 4 and 5). As such, the locking device housing 244 can extend out of the top portion of the channel 206. The fixed pulley 230 may include one or more wheels 250 as required or desired. In other examples, the locking device housing 244 can be independent and separate from the fixed pulley 230, for example, to enable the locking device 224 to be placed at other locations on the window balance. In one example, the locking device 224 may be an independent component that can be coupled to the window jamb and with the cord extending therethrough. In another example, the locking device 224 may be placed within the U-shaped channel. These examples enable the locking device 224 to be attached to existing block and tackle window balances and provide an alternative or additional locking mechanism and prevent cord retraction.

As described above, the locking device 224 includes the axle 234 rotatably supported by the locking device housing 244 and the pawl 232. The actuator arm 236 extends from a side of the locking device housing 244 and out of the elongated slot of the window jamb such that the window sash can be contacted. In the example, the actuator arm 236 has two tapered and oblique surfaces 252 on either side of the arm 236. These surfaces 252 enable the window sash to engage with the pawl 232 and depress the actuator arm 236 into the locking device housing 244 when the window sash covers the elongated slot of the jamb. Additionally, with the surfaces 252 being on both sides of the arm 236, the locking device 224 can be used in either the left or right window jamb without any changes to the device.

The cord engagement arm 238 is on the other side of the pawl 232 from the actuator arm 236 and extends from a top portion of the locking device housing 244 while in an unlocked configuration that is shown in FIGS. 6 and 7. At the tip of the cord engagement arm 238, one or more teeth 240 are formed. The teeth 240 are configured to increase frictional engagement of the cord so that retraction of the cord is prevented.

In the example, the cord 216 (shown in FIGS. 4 and 5) extends though the opening 246 of the locking device housing 244 and the opening 246 is positioned opposite of the actuator arm 236. By at least partially enclosing the cord within the housing 244, an engagement wall 254 is formed that is used to compress and engage the cord in the locked configuration. In some example, the engagement wall 254 may include one or more grip features (e.g., a rough surface, one or more protrusions or teeth, etc. and not shown) that increases frictional engagement between the wall 254 and the cord. As such, when the locking device 224 is in the locked configuration described above, the cord is compressed between the cord engagement arm 238 and the engagement wall 254.

The locking device housing 244 is formed from a more rigid material than the window jamb so that in the locked configuration, the cord engagement arm 238 can increase compression and engagement of the cord when compared to engaging the cord between the arm 238 and the jamb wall. In other examples, however, the locking device 224 may engage the cord between the cord engagement arm 238 and the jamb wall as required or desired. Additionally, a through-hole 256 is formed within the fixed pulley 230 so that it can be coupled to the U-shaped channel (e.g., via the rivet 231 shown in FIG. 4).

Figure 8:
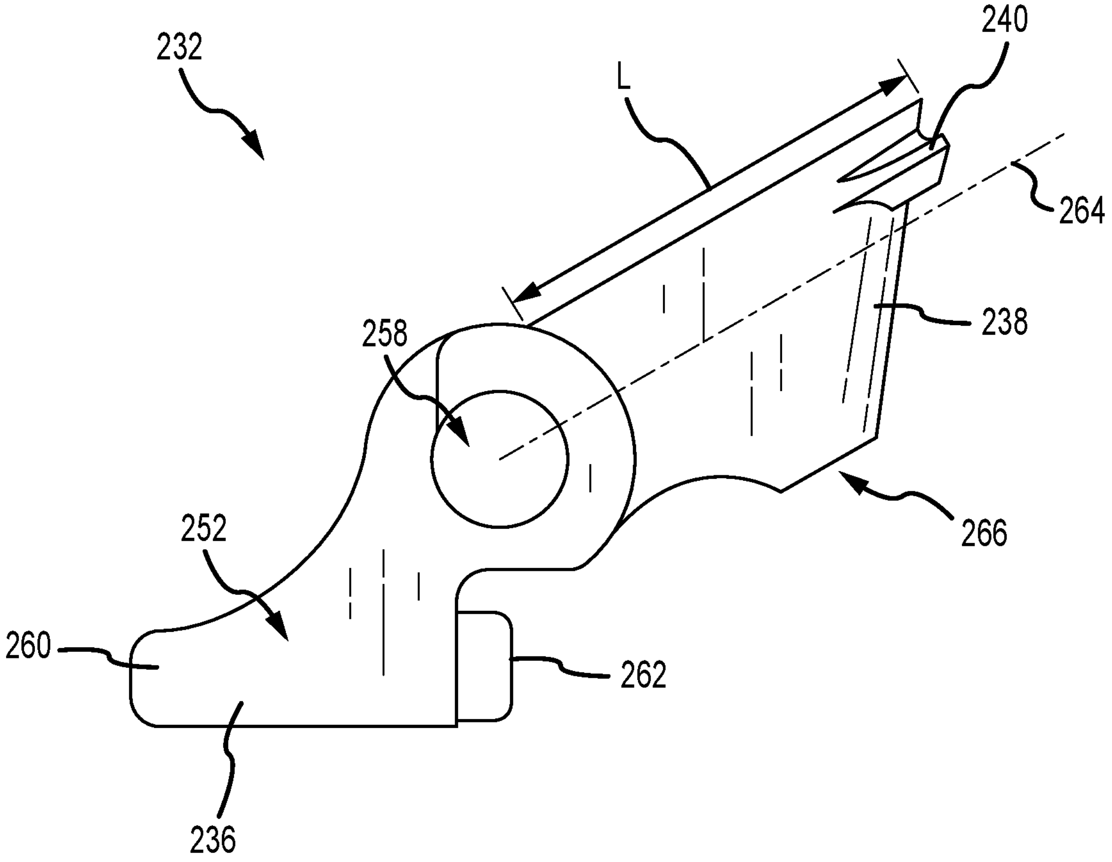
FIG. 8 is a side view of a pawl for the locking device shown in FIG. 6.

FIG. 8 is a side view of the pawl 232 for the locking device 224 (shown in FIGS. 6 and 7). The pawl 232 includes an aperture 258 that is sized and shaped to receive the axle 234 (shown in FIGS. 6 and 7) so that the pawl 232 is rotatable about the axle 234. Extending in one direction is the actuator arm 236 with the oblique surfaces 252 that taper towards a nose 260. The actuator arm 236 is configured to engage with the window sash and rotate the pawl 232 towards the unlocked configuration. Opposite of the nose 260, a cylindrical projection 262 extends from the actuator arm 236 so that the actuator arm 236 can be coupled to the biasing element 242 (shown in FIGS. 4 and 5) and bias the pawl 232 towards the locked configuration.

Extending in another direction is the cord engagement arm 238 with one or more teeth 240. In the example, the pawl 232 includes a single tooth 240 that extends substantially parallel to a radial axis 264 of the arm 238 from the aperture 258 that defines the pawl's 232 rotational axis. The tooth 240 may extend outwards from the tip of the cord engagement arm 238 to provide further frictional engagement with the cord and prevent movement thereof when in the locked configuration. In one example, the tooth 240 may extend outwards between 0.001 inches and 0.01 inches. In another example, the tooth 240 may extends outwards approximately 0.003 inches.

A length L of the cord engagement arm 238 along the radial axis 264 must be long enough to extend to the cord 216 (shown in FIG. 5), such that when in the locked configuration the cord engagement arm 238 can contact the cord and generate the compression force to engage the cord. However, the length L cannot be too long so that the cord engagement arm 238 cannot apply enough compressive force against the cord to prevent retraction of the cord through the locking device 224 (shown in FIGS. 6 and 7). In the example, the length L of the cord engagement arm 238 is slightly less than the distance between the axle 234 and the engagement wall 254 of the locking device housing 244 (shown in FIGS. 6 and 7). This length L, enables the cord engagement arm 238 to initially compress the cord against the stationary engagement wall 254 with the biasing force from the biasing element so as to frictionally secure the cord between the pawl 232 and the wall 254. Additionally, the length L enables the pawl 232 to partially over rotate towards the stop 248 of the locking device housing 244 (both shown in FIG. 5) when the cord is retracting such that the retracting force acts to further compress the cord between the pawl 232 and the engagement wall, and secure the cord within the locking device.

The cord engagement arm 238 includes a stop surface 266 that interacts with the stop 248 of the locking device housing 244 so as to prevent the pawl 232 from rotating completely around the axle 234 (shown in FIG. 5), when in the locked configuration. In the example, the stop surface 266 is oriented so that in the locked configuration, the cord engagement arm 238 is substantially orthogonal to the engagement wall 254. In other example, the cord engagement arm 238 may be configured to stop rotation in the locked configuration before reaching 90° relative to the engagement wall 254, or past 90°, as required or desired. In an example, the pawl 232 can rotate about is axle 234 (shown in FIGS. 6 and 7) between approximately 30° and 60° so as to lock and unlock the locking device. In an aspect, this rotational angle is approximately 40°.

Figure 9:
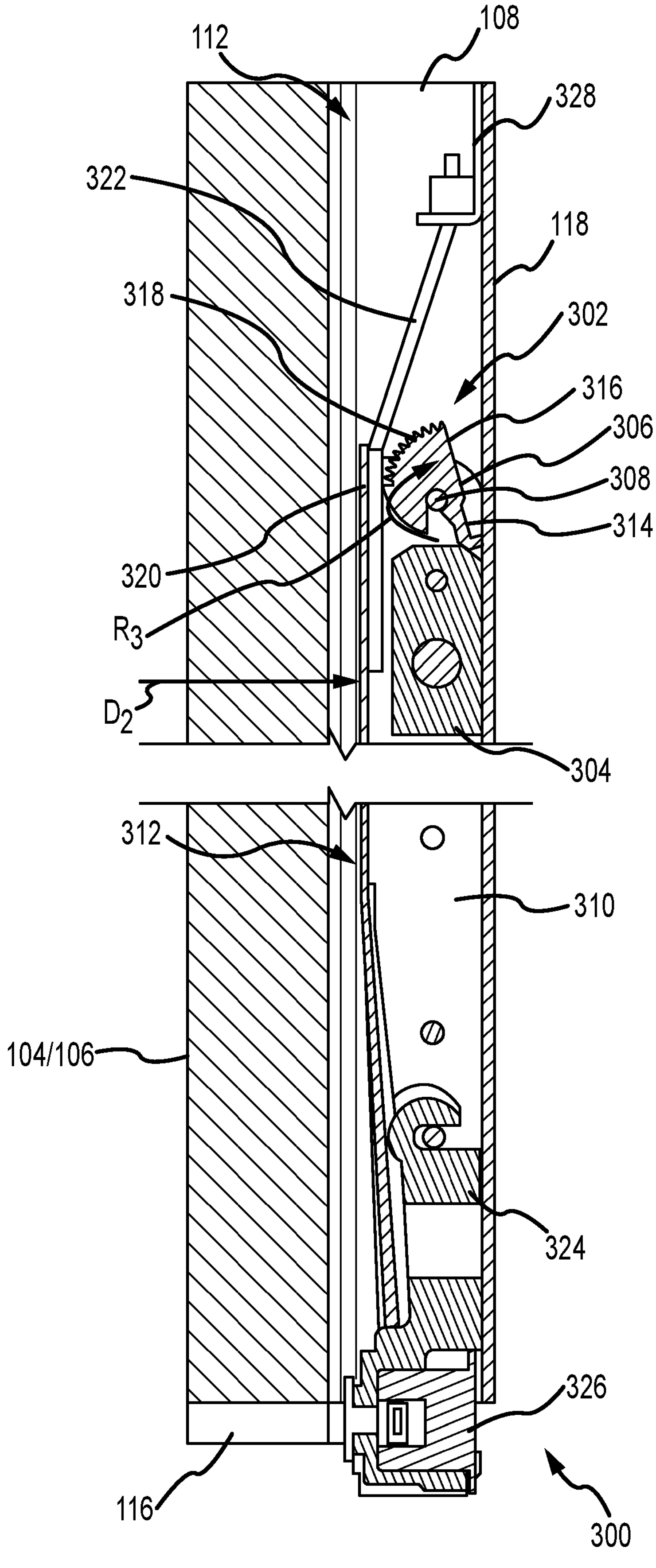
FIG. 9 is a cross sectional view of another window balance system in an unlocked configuration.

FIG. 9 is a cross sectional view of another window balance system 300 in an unlocked configuration. In this example, the window balance 300 is also a block and tackle-type window balance, and as such, many of the components are similar to the example described above. However, the configuration of a locking device 302 has changed. The locking device 302 is separated from a fixed pulley 304 and includes a rotatable pawl 306 mounted on a rivet 308 that extends across walls 310 of a U-shaped channel 312. The pawl 306 includes an actuator arm 314 and an opposite cord engagement arm 316 that has a plurality of teeth 318. The actuator arm 314 is positioned adjacent to the back wall 118 of the window jamb 108 and the cord engagement arm 316 is positioned adjacent to a base wall 320 of the U-shaped channel 312. In this example, a flexible cord 322 of the window balance 300 extends between the base wall 320 of the channel 312 and the cord engagement arm 316.

The window balance 300 also includes a shoe 324, a rotatable cam 326 that is configured to receive the pivot bar 116, and a jamb mounting attachment 328. Additionally, some components of the block and tackle balance element (e.g., the spring and transverse pulley) are not illustrated in FIG. 9 for clarity. It should be appreciated, that while the shoe 324 is illustrated with the cam 326, similar to the example described above, the shoe 324 need not have a rotatable cam and can be the shoe described in FIGS. 15-17 and 27-30 herein.

In this example, when the window sash 104, 106 is aligned with the window jamb 108 and covers the elongated slot 112 of the window jamb 108, the window sash 104, 106 contacts at least a portion of the base wall 320 of the U-shaped channel 312 and moves the channel 312 towards the back wall 118 of the jamb 108 in a direction $D_2$. This movement of the U-shaped channel 312 generates rotation $R_3$ of the pawl 306 via the actuator arm 314 against the back wall 118 of the jamb 108 and moves the cord engagement arm 316 away from the cord 322. As such, the cord 322 is allowed to extend and retract from the U-shaped channel 312 and freely pass through the locking device 302 without being engaged by the pawl 306. Thus, when the locking device 302 is in the unlocked configuration, the window balance 300 is enabled for sliding movement of the window sash 104, 106 and to provide a balancing force.

Figure 10:
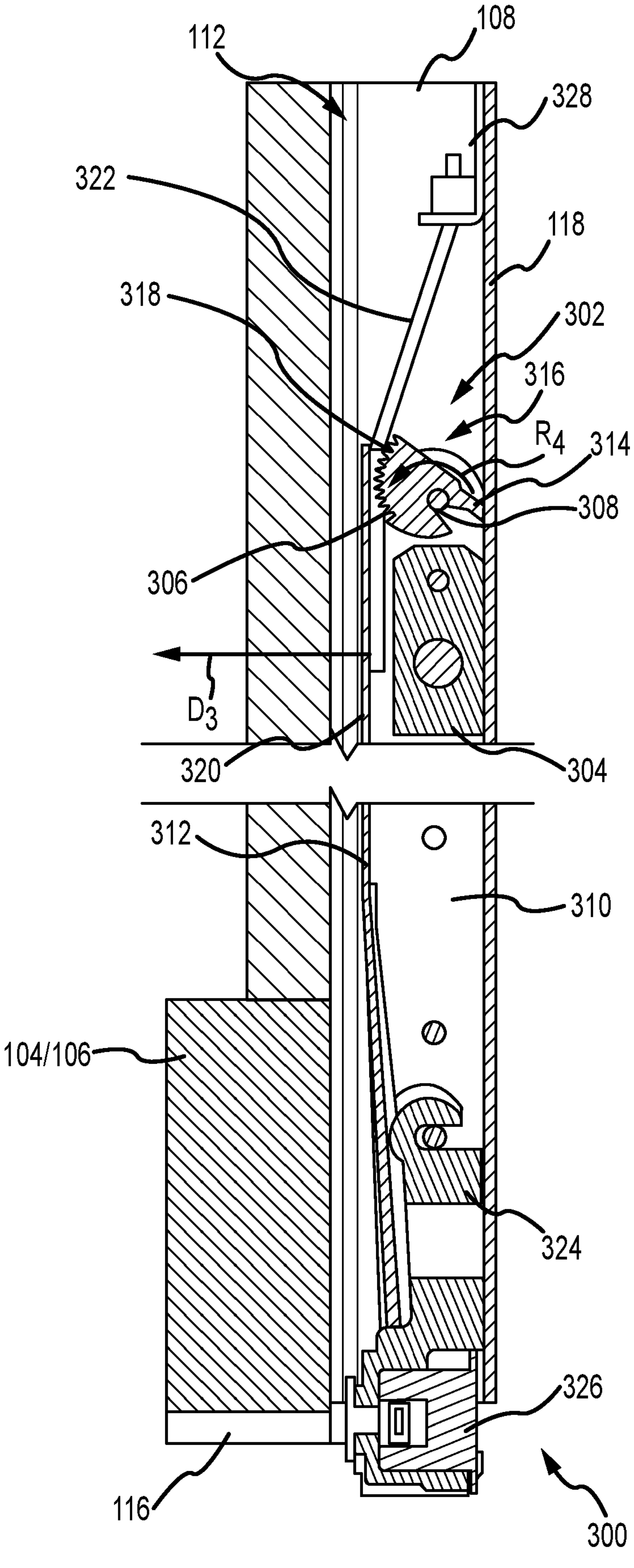
FIG. 10 is a cross sectional view of the window balance system shown in FIG. 9 in a locked configuration.

FIG. 10 is a cross sectional view of the window balance system 300 in a locked configuration. Certain components are described above, and thus, and not described further. In the locked configuration, the window sash 104, 106 is tilted out of the window frame and away from the window jamb 108, or completely removed from the window frame. When the window sash 104, 106 is tilted out of the window jamb 108, the elongated slot 112 becomes uncovered and the top portion of the U-shaped channel 312 can pivot at least partially out of the window jamb 108 in a direction $D_3$ and through the elongated slot 112. This movement of the channel 312 is induced by the pivot bar 116 loading on the interior side of the shoe 324.

The movement of the channel 312 provides space within the jamb 108 for the pawl 306 to rotate $R_4$ towards the base wall 320 of the channel 312 and engage with the cord 322. More specifically, the actuator arm 314 is moved away from the back wall 118 of the jamb 108, thus enabling rotation thereof. Additionally, this movement of the channel 312 occurs automatically so that the locking device 302 is automatically biased to rotate towards the locked configuration. In some examples, the pawl 306 may include a biasing element (e.g., a spring, not shown) to facilitate movement in the rotation direction $R_4$, however, this is not required. In other examples, the pawl 306 may be weighted to facilitate movement in the rotation direction $R_4$.

In the locked configuration, as the cord engagement arm 316 rotates $R_4$ towards the cord 322, the cord engagement arm 316 compresses the cord 322 to prevent retraction of the cord. The cord 322 is compressed between the cord engagement arm 316 and the base wall 320 of the U-shaped channel 312. This rotation direction of the pawl 306 is substantially similar of the retraction direction of the cord 322 (e.g., into the U-shaped channel 312 and through the locking device 302) so that the cord engagement arm 316 is further pulled into the locked configuration when engaged with the cord 322. As such, the cord 322 is restricted from retracting into the U-shaped channel 312 and prevents upward movement of the window balance 300 within the window jamb 108.

Figure 11:
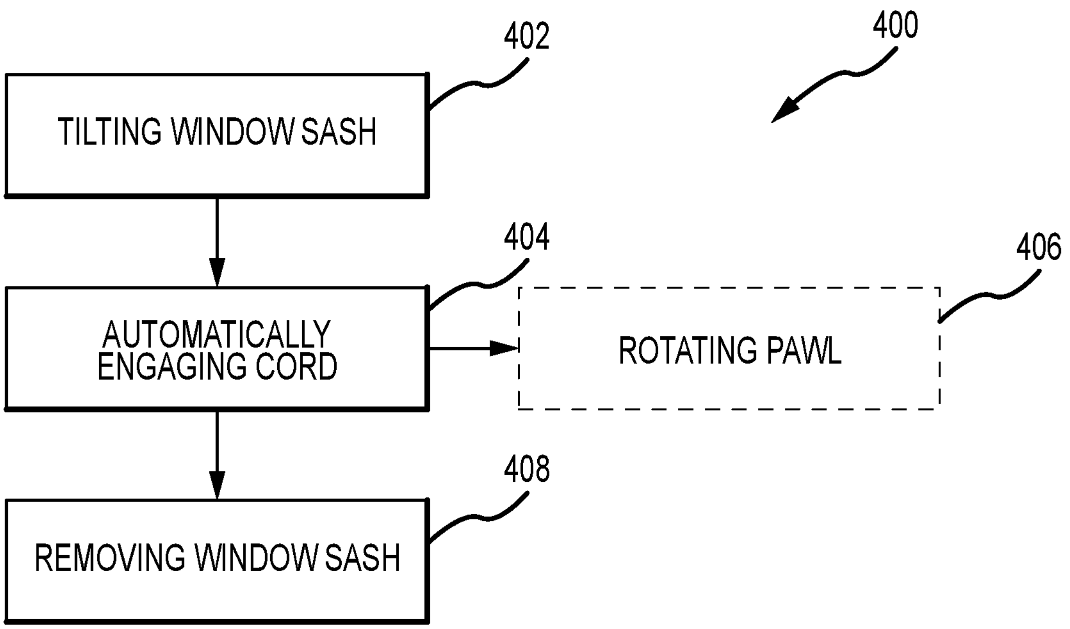
FIG. 11 is a flowchart illustrating a method of removing a window sash from a window frame.

FIG. 11 is a flowchart illustrating a method 400 of removing a window sash from a window frame. The window sash being supported by at least one block and tackle window balance. The method 400 includes tilting a top rail of the window sash out of the window frame (operation 402). Simultaneously with the tilting operation (operation 402), a cord of the block and tackle window balance is automatically engaged by a locking device so as to prevent movement of the cord relative to the locking device (operation 404). In an example, the locking device includes a rotatable pawl that can have an actuator arm and a cord engagement arm. As such, when the window sash is tilted, the actuator arm loses contact with the window sash and a pawl biasing element rotates the cord engagement arm towards the cord for engagement. As the cord begins to retract into the window balance, the cord engagement arm that is in contact with the cord rotates over center and compresses the cord against a pulley housing, thereby preventing further cord retraction (operation 406). The window sash can then be removed from the block and tackle window balance, while the window balance remains in place within a window jamb (operation 408).

Once the cord is engaged within the locking device, the cord cannot be disengaged until the window sash is reinstalled into the window frame and in its normal operating position. This window sash operating position, rotates the pawl so as to disengage from the cord because the window sash is in contact with the actuator arm.

Figure 12:
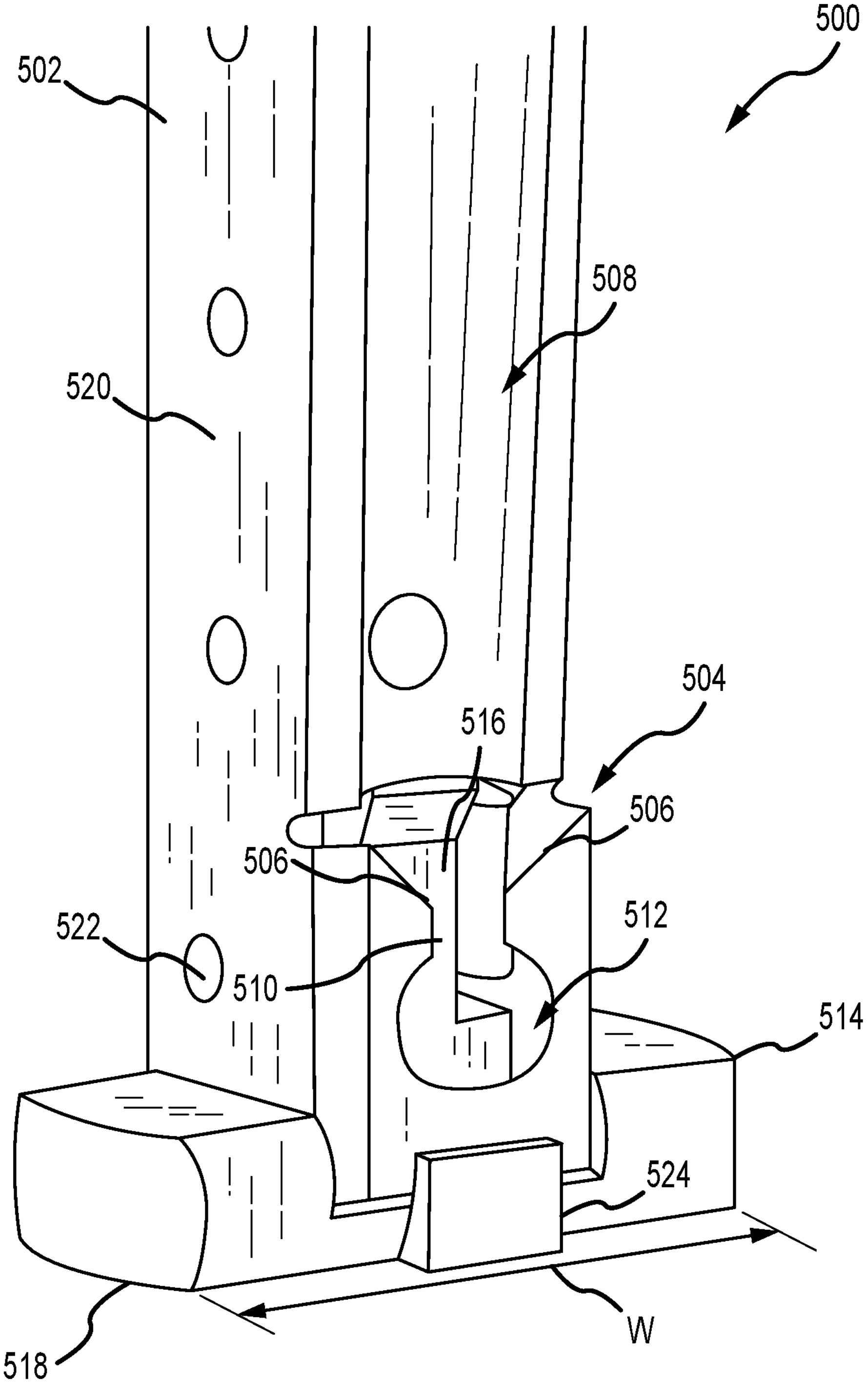
FIG. 12 is a partial perspective view of another window balance system.
Figure 13:
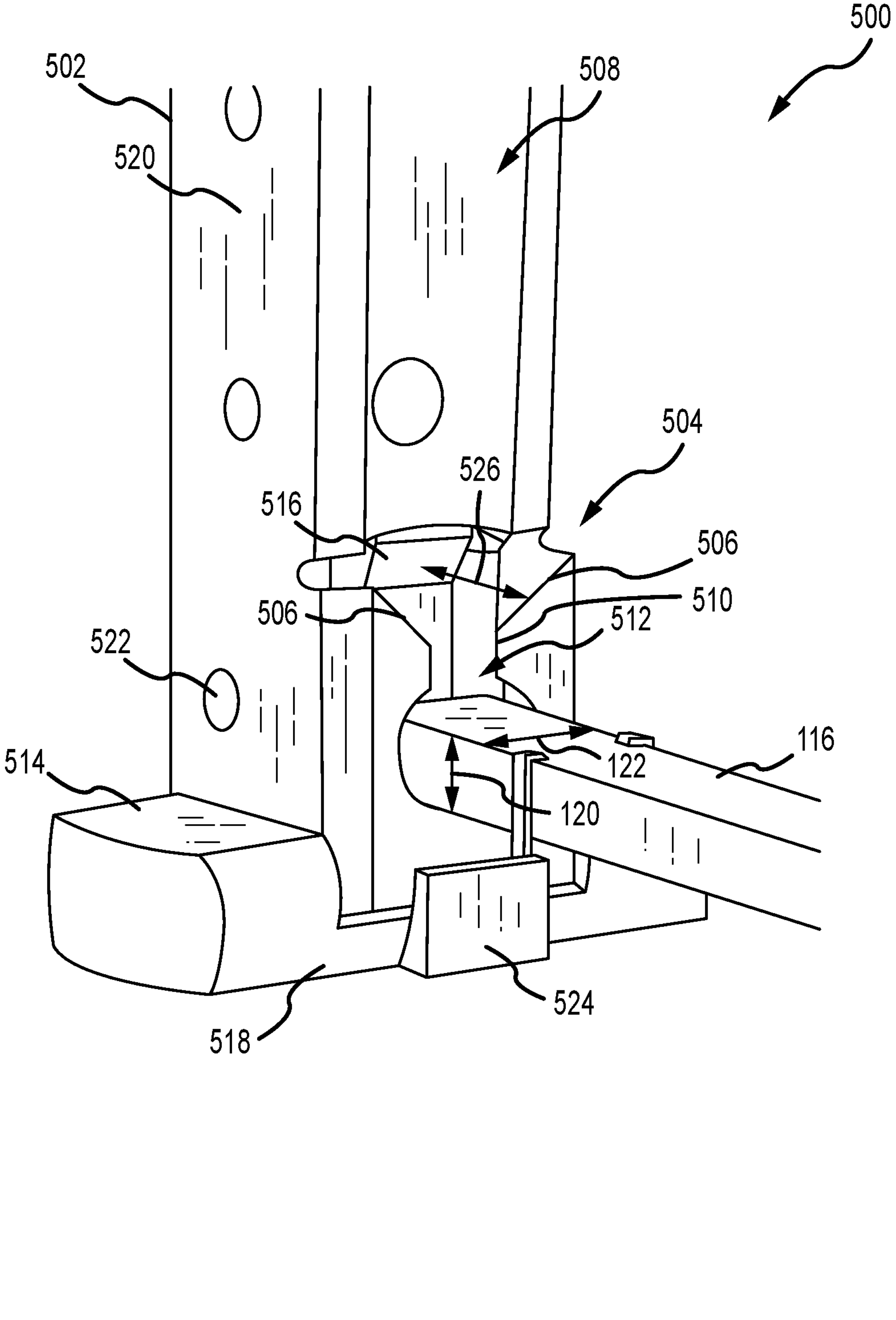
FIG. 13 is another partial perspective view of the window balance system shown in FIG. 12 having a pivot bar engaged therewith.

FIG. 12 is a partial perspective view of another window balance system 500. FIG. 13 is another partial perspective view of the window balance system 500 having the pivot bar 116 engaged therewith. Referring concurrently to FIGS. 12 and 13, the window balance system 500 includes a U-shaped channel 502 that contains therein a block and tackle balance system of a fixed block, a movable block, a cord extending therebetween, and a spring as described herein and that are not illustrated for clarity. Configurations and functionality of block and tackle window systems are well-known in the art. The U-shaped channel 502 includes, at one end, a receiver 504 having sloped or angled leading surfaces 506. The receiver 504 is disposed at a bottom end of a tapered groove 508, which allows for "drop-in" insertion of the pivot bar 116 into the receiver 504 during window sash installation. Disposed below the leading surfaces 506 is a narrow throat 510 configured to receive a narrow dimension 120 of the pivot bar 116 during insertion or removal thereof from the receiver 504. A wider pivot bar opening 512 is dimensioned to receive a wide dimension 122 of the pivot bar 116 in any orientation. The narrow throat 510 also prevents the pivot bar 116 from being inadvertently disengaged from the receiver 504 (since the narrow dimension 120 must be substantially aligned with the throat 510 to properly remove the pivot bar 116 therefrom).

The window balance system 500 also includes a shoe 514 that is coupled to the end of the U-shaped channel 502 proximate the receiver 504. The shoe 514 includes an elongate portion 516 at least partially disposed in the U-shaped channel 502, proximate the receiver 504. An enlarged portion 518 of the shoe 514, extending from sides thereof, extends beyond opposing outer walls 520 of the U-shaped channel 502. The enlarged portion 518 may define a width W consistent to be utilized in window jambs having a nominal 1 inch width, a nominal 1-¼ inch width, or other widths as required or desired for a particular application. The enlarged portion 518 is configured to slide along the side walls of the window jamb, so as to prevent lateral motion of the window sash within the window frame. The height, width, and depth dimensions of the enlarged portion 518 enable simplified insertion of the window balance system into an assembled window, for example, for repair and replacement thereof. This insertion is similar to that depicted in U.S. Pat. No. 6,679,000.

The shoe 514 is connected to the first end of the U-shaped channel 502 via a screw, rivet, locking tabs, and/or other known elements. In the example, locking tabs 522 are used to couple the shoe 514 to the U-shaped channel 502. Additionally in the depicted example, a catch 524 is disposed on a front of the shoe 514, to help secure the shoe 514 to the U-shaped channel 502. The catch 524 is configured to extend at least partially around the bottom edge of the U-shaped channel 502, so as to prevent accidental disengagement therebetween. The catch 524 may extend an upward distance along the U-shaped channel 502, so as to not interfere with (or be interfered with by) the pivot bar 116 and as depicted in FIG. 13.

FIG. 13 also illustrates a further detail regarding the receiver 504 and the pivot bar 116. Pivot bars 116 often utilize an enlarged head to prevent the bar from being inadvertently dislodged from the balance 500 with which they are engaged. As can be seen in FIG. 13, the receiver 504 projects a distance 526 beyond the grooved portion 508 of the U-shaped channel 502, so as to accommodate this enlarged head. During insertion, the pivot bar 116 is aligned with the groove 508, such that the wide dimension 122 thereof is substantially vertical, and the enlarged head is guided down along the groove 508. As the head exits the groove 508, it passes into the volume defined by the distance 526 between the receiver 504 and the groove 508, and is guided by the leading surfaces 506 into the pivot bar opening 512. Upon rotation of the pivot bar 116 (that is, an upward tilting of the associated sash), the pivot bar 116 is disposed in an orientation that prevents simple lifting removal of the pivot bar 116 from the pivot bar opening 512 and the window sash may be raised and lowered.

The engagement between the pivot bar 116 and the U-shaped channel 502 is particularly apparent in FIG. 13. Thus, as the spring (not shown) disposed within the U-shaped channel 502 provides an upward pulling force on the U-shaped channel 502, this force is transferred directly to the pivot bar 116 in shear via contact between the edge of the pivot bar opening 512 and the pivot bar 116. This force, in turn, transfers directly to the window sash. Thus, the force of the spring is transferred directly through the metal components of the balance system 500 (e.g., from the U-shaped channel 502 to the pivot bar 116) bypassing any plastic components. This results in a more robust system that is less prone to failure than other window balance systems that transfer forces through a plastic shoe or other weaker components. While most of the forces at transferred between the channel 502 and the pivot bar 116 connection, the shoe 514 enables for the end of the channel 502 to be more secured within the window jamb without undesirable movement and rattling. Additionally, the shoe 514 provides further structure to the bottom of the U-shaped channel 502 so as to increase the connection strength of the receiver 504.

Figure 14:
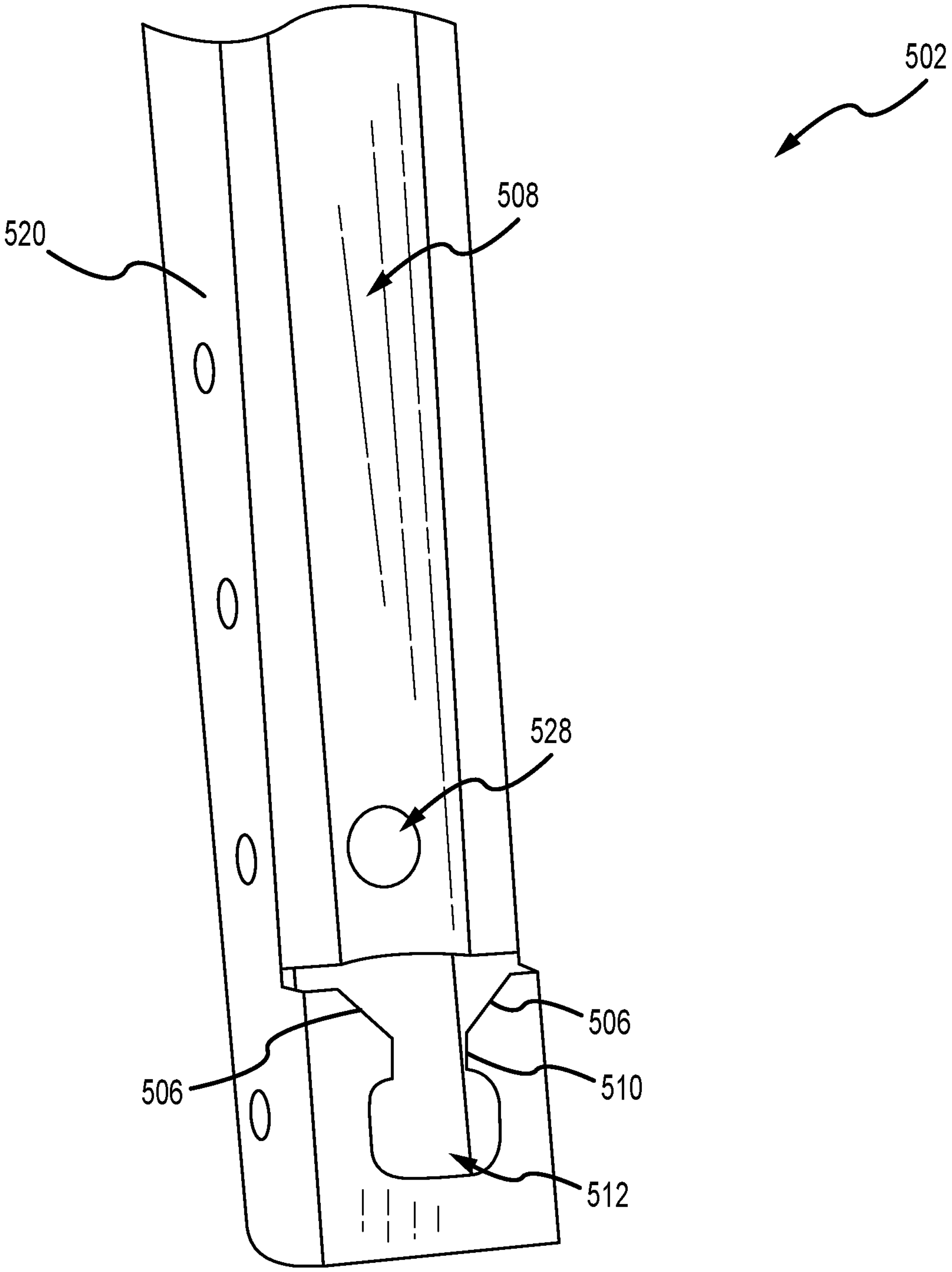
FIG. 14 is a partial perspective view of a U-shaped channel of the window balance system shown in FIGS. 12 and 13.

FIG. 14 is a partial perspective view of the U-shaped channel 502 of the window balance system 500 (shown in FIGS. 12 and 13). Certain components are described above, and thus, are not necessarily described further. As described above, the U-shaped channel 502 includes the groove 508 and the receiver 504. A snap opening 528 is defined at a lower portion of the groove 508 and may be sized and configured to accommodate a corresponding projection extending from a front face of the shoe (not shown). Such projections are depicted, for example, in U.S. Patent Application Publication No. 2019/0085609, the disclosure of which is hereby incorporated by reference herein in its entirety. Additionally illustrated in FIG. 14 is the pivot bar opening 512, the leading surfaces 506, and the throat 510.

It should be appreciated that while the U-shaped channel 502 is shown with the groove 508, the leading surfaces 506, and the throat 510, in other examples, some, or all of the features, may take on different shapes and or sizes as required or desired. For example, in an aspect, the groove 508 may be a substantially planer tapered surface towards the receiver 504. In another aspect, the throat 510 may be removed so that the leading surfaces 506 extend all the way to the pivot bar opening 512. In yet another aspect, the leading surface 506 may be removed in the receiver 504. Other combinations and configurations of the receiver 504 are also contemplated herein.

Figure 15:
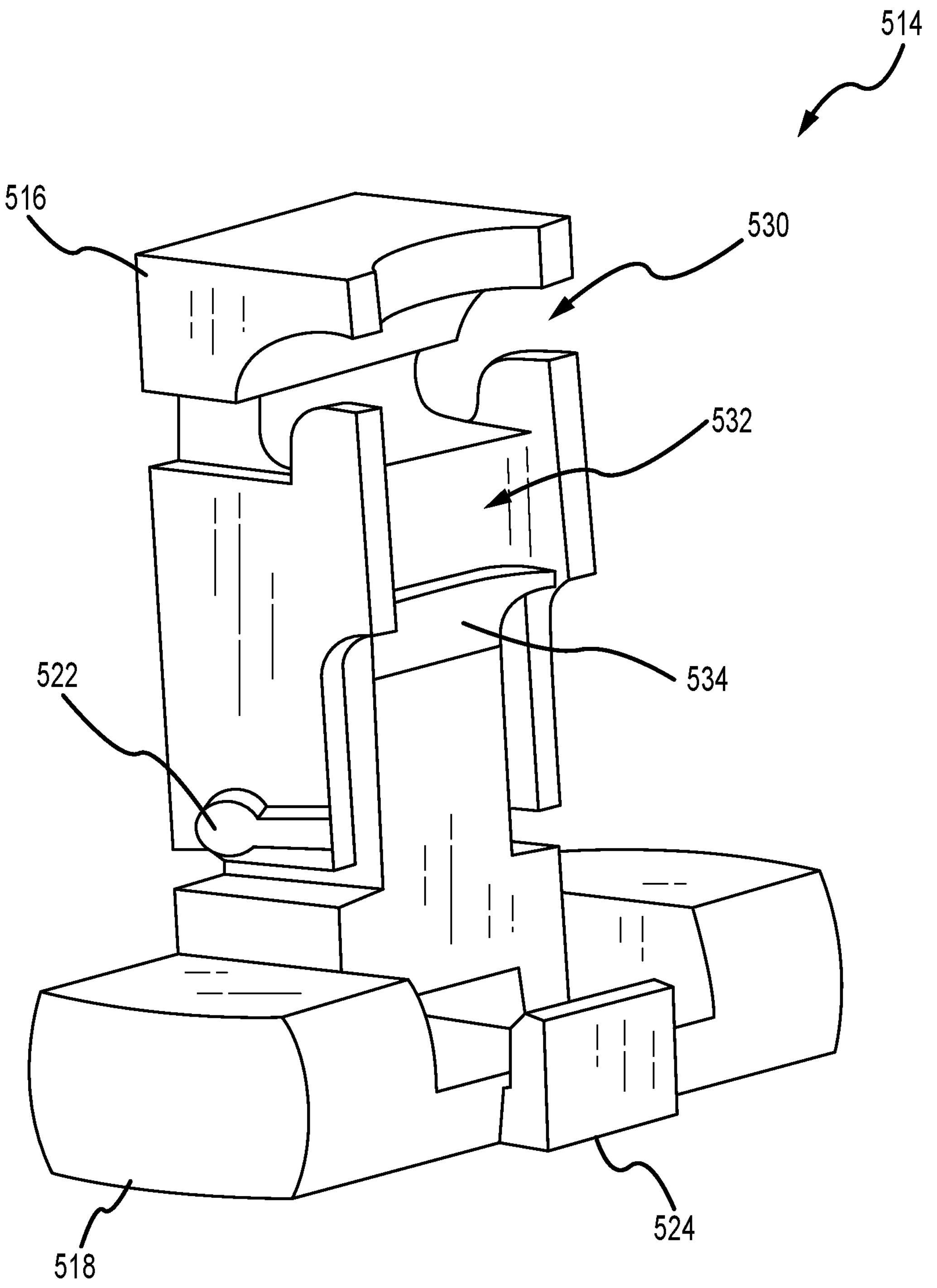
FIG. 15 is a perspective view of a shoe for the window balance system shown in FIGS. 12 and 13.

FIG. 15 is a perspective view of the shoe 514 for the window balance system 500 (shown in FIGS. 12 and 13). The shoe 514 includes the elongate portion 516 that is configured to be secured to the U-shaped channel 502 (shown in FIG. 14). In examples, at least a portion of the elongate portion 516 may be received within the U-shaped channel 502. A number of features may be utilized to secure the shoe 514 to the U-shaped channel 502. Locking tabs 522, such as those depicted in U.S. Patent Application Publication No. 2019/0085609, are located on the sides of the elongate portion 516. As noted above a central projection (not shown) may also be utilized that projects through the groove of the U-shaped channel. An upper portion of the elongate portion 516 at least partially defines an opening or hook 530 that may be secured to a rivet that may span the walls 520 of the U-shaped channel 502 (shown in FIGS. 12 and 13). In other examples, the shoe 514 may be secured to the U-shaped channel 502 via one or more screws, bolts, fasteners, rivets, adhesive elements, etc. As noted above, the catch 524 further helps prevent rotation of the shoe 514 and disengagement from the U-shaped channel 502.

The elongate portion 516 of the shoe 514 also defines a corresponding groove 532 that may mate with a rear surface of the groove 508 in the U-shaped channel 502 (shown in FIG. 14). A shelf 534, ramp, or other guide may project from this groove. The shelf 534 may be disposed at a location proximate where the groove 532 terminates. The shelf 534 may project towards the end of the groove 532 so as to prevent the enlarged head of the pivot bar 116 (shown in FIG. 13) from inadvertently catching in the U-shaped channel 502 during removal thereof from the receiver 504 (shown in FIG. 14). As noted above, the enlarged portion 518 may define a width W (shown in FIG. 13) consistent to be utilized in window jambs having a nominal 1 inch width, a nominal 1-¼ inch width, or other widths as required or desired for a particular application.

Figure 16:
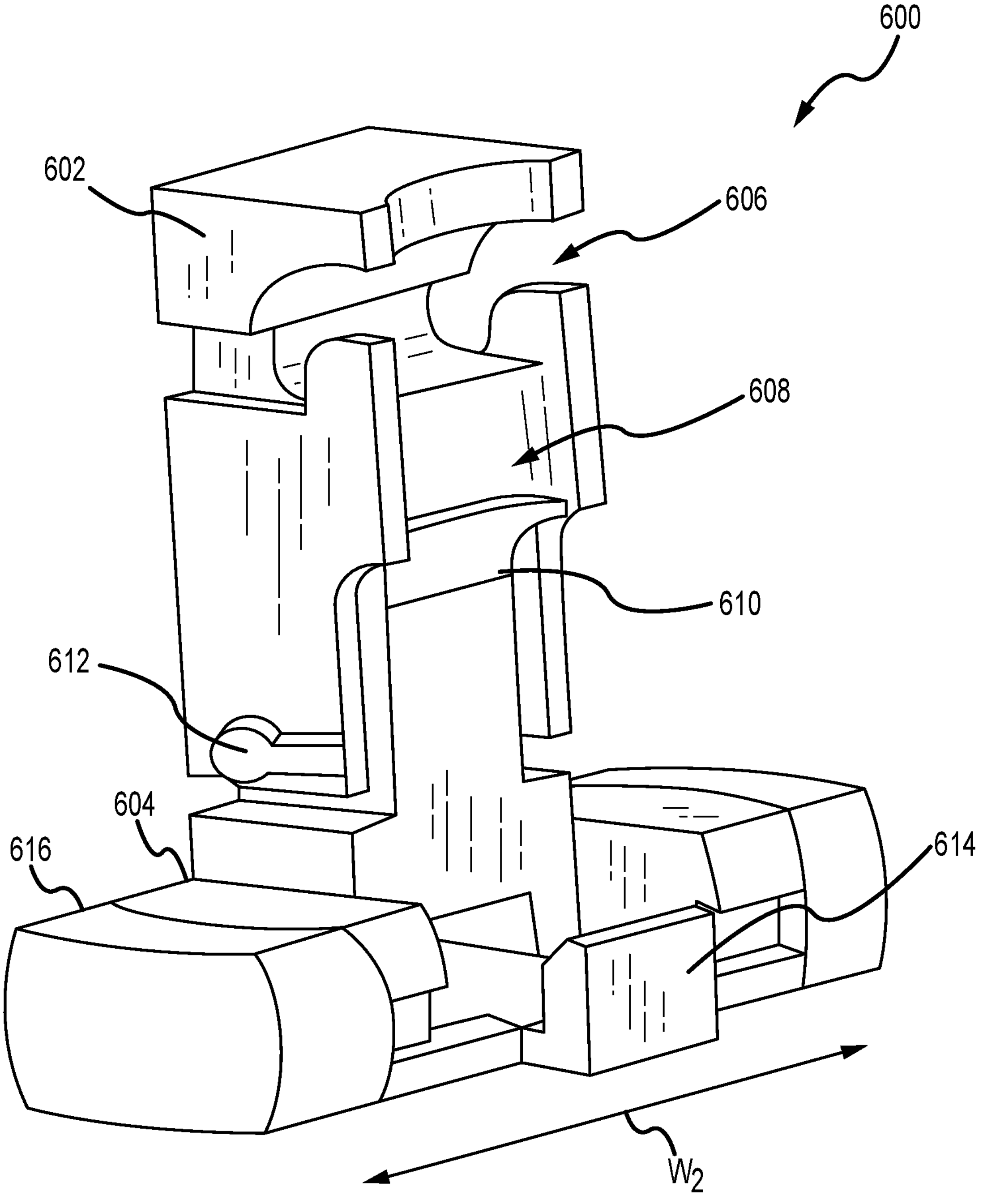
FIG. 16 is a perspective view of another shoe for the window balance system shown in FIGS. 12 and 13.
Figure 17:
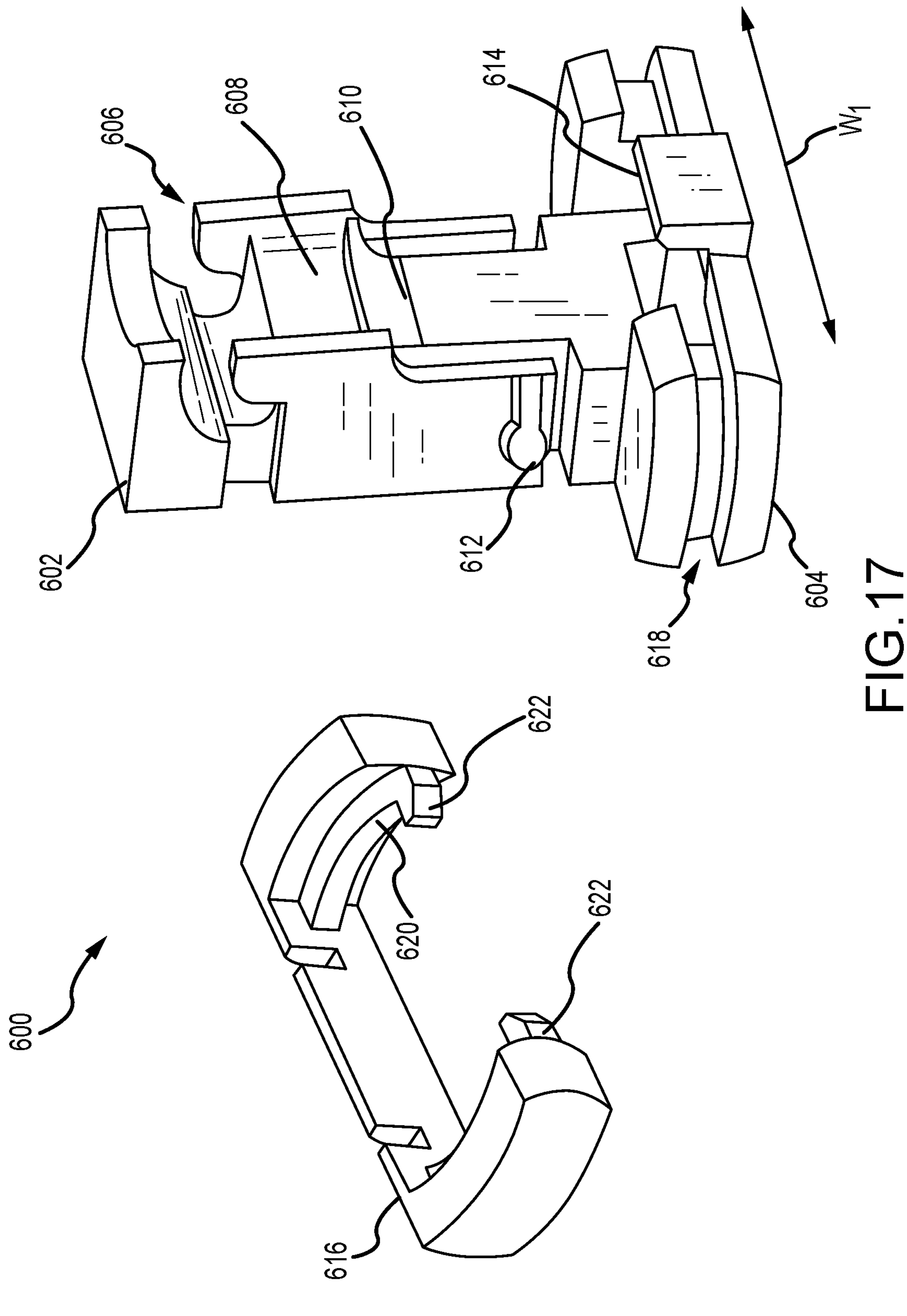
FIG. 17 is an exploded perspective view of the shoe shown in FIG. 16.

FIG. 16 is a perspective view of another shoe 600 for the window balance system 500 (shown in FIGS. 12 and 13). FIG. 17 is an exploded perspective view of the shoe 600. Referring concurrently to FIGS. 16 and 17, the shoe 600 has an elongate portion 602 and an enlarged portion 604. Similar to the example described above, the elongate portion 602 has a hook 606, a groove 608, a shelf 610, and locking tabs 612. Additionally, the shoe 600 includes a catch 614. However in this example, the enlarged portion 604 has a detachable extension 616 that can selectively couple thereto. As noted above with regard to the shoe 514 of FIG. 12, the enlarged portion 604 of the shoe 600 may define a width so as to be used in conjunction with a window jamb channel having a particular nominal width (e.g., 1 inch, 1-¼ inch, etc.). In this example, the detachable extension 616 enables the width W of the enlarged portion 604 to be adjustable.

For example and as illustrated in FIG. 17, the detachable extension 616 is not coupled to the enlarged portion 604 so that the enlarged portion 604 defines a first width $W_1$. As illustrated in FIG. 16, the detachable extension 616 is coupled to the enlarged portion 604 so that a second width $W_2$ is defined. In this example, the second width $W_2$ is greater than the first width $W_1$. In an aspect the enlarged portion 604 that has a width $W_1$ appropriate for a window jamb having a nominal width of 1 inch. The enlarged portion 604 defines perimeter grooves 618 for receiving mating rails 620 projecting from an inner surface of the extension 616. Retention teeth 622 on each rail 620 prevent disengagement of the extension 616 from the enlarged portion 604 when secured thereto. The extension 616, then, defines a width $W_2$ appropriate for a window jamb having a nominal width of 1-¼ inch. Thus, the same shoe 600 may be sent to window manufacturers and/or customers, who may then remove or maintain the extension 616 if required to accommodate their particular size window jamb.

Figure 18:
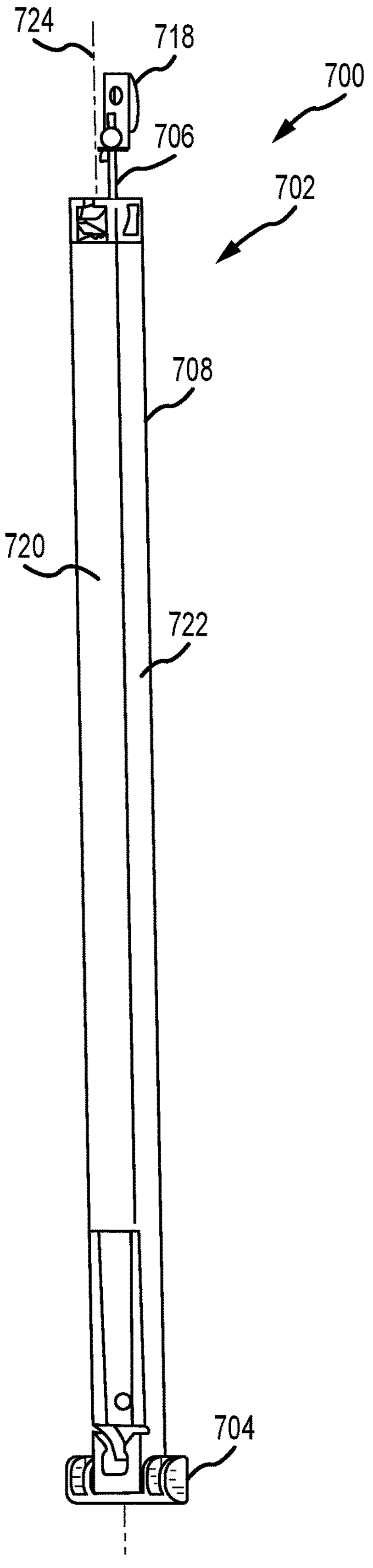
FIG. 18 is a front perspective view of another block and tackle window balance system.
Figure 19:
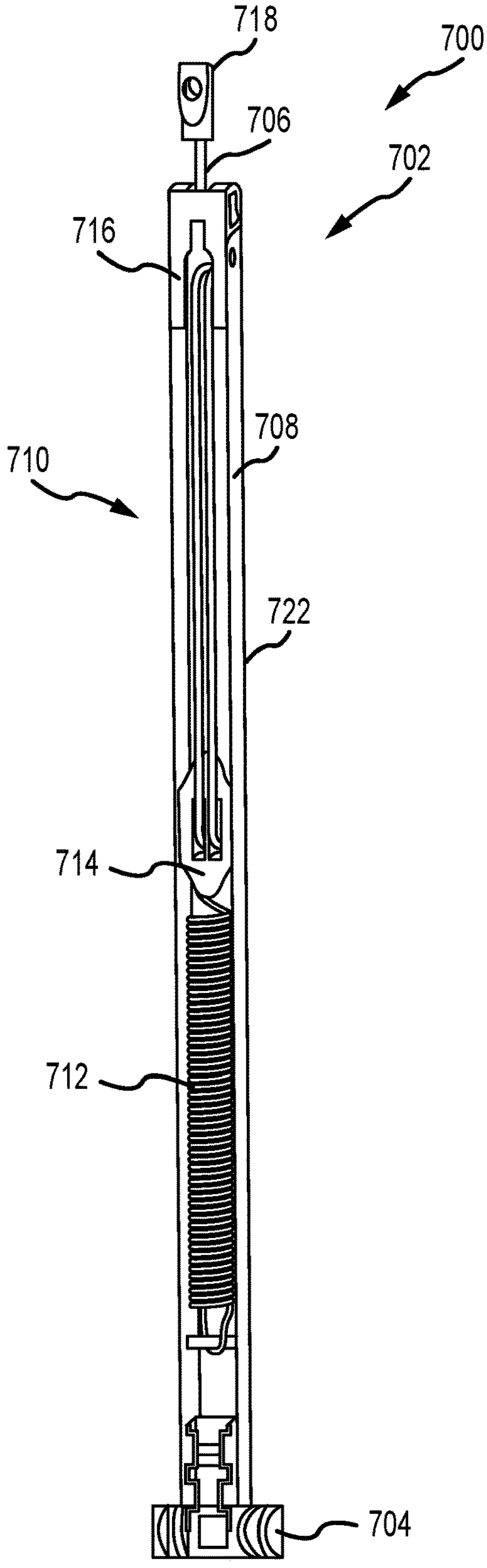
FIG. 19 is a rear perspective view of the window balance system shown in FIG. 18.

FIG. 18 is a front perspective view of another block and tackle window balance system 700. FIG. 19 is a rear perspective view of the window balance 700. Referring concurrently to FIGS. 18 and 19, the window balance system 700 is configured to support the window sash relative to the window jamb, and allow the window sash to slide and pivot relative thereto, similar to the examples described above. In this example, the window balance system 700 is a block and tackle type balance with a locking device 702 disposed at the top and a shoe 704/channel configuration disposed at the bottom. Similar to the examples described above, the locking device 702 is configured to engage with a cord 706 so as to lock the balance element and allow the window sash to pivot out of the window frame without retraction of the balance element. Additionally, similar to the examples described above, the shoe 704/channel configuration are configured to directly engage with the pivot bar of the window sash and increase the connection strength thereof. It should be appreciated that while the locking device 702 and the shoe 704 are described as components of the window balance system 700, the locking device 702 and shoe 704 can be utilized independent of one another and components in other window balance systems as required or desired.

In the example, the window balance system 700 includes a U-shaped channel 708 that supports a block and tackle balance element 710. The balance element 710 includes an extension spring 712, a translatable pulley 714, a fixed pulley 716, and the cord 706 that wraps between the pulleys 714, 716 and with a free end connected to a jamb mounting attachment 718. The extension spring 712 is coupled between the U-shaped channel 708 (e.g., via a rivet) and the translatable pulley 714. The U-shaped channel 708 includes a base wall 720 and two opposing walls 722, and defines a longitudinal axis 724.

The locking device 702 is coupled to the fixed pulley 716 and extends from the top of the U-shaped channel 708. The locking device 702 is described further below in reference to FIGS. 20-24. The shoe 704 is coupled to the bottom of the U-shaped channel 708 and is described further below in reference to FIGS. 27-29. Similar to the examples described above, the shoe 704 has an elongate portion and an enlarged portion so that the shoe 704 is substantially T-shaped. This shape of the shoe 704 facilitates a more efficient installation procedure of the window balance system 700. For example, the installation procedure includes an orientation step that has the enlarged portion oriented along the longitudinal axis 724 and the window balance system 700 is inserted substantially orthogonal into the window jamb with the shoe end first. Then the system 700 is rotated approximately 90° while extending out of the window jamb so that the enlarged portion is orthogonal to the longitudinal axis 724 in a first rotation step. A second rotation step is then performed to rotate the window balance system 700 approximately 90° again and into the window jamb. This installation process is described in further detail in U.S. Pat. No. 6,679,000 at FIGS. 10-13.

Figure 20:
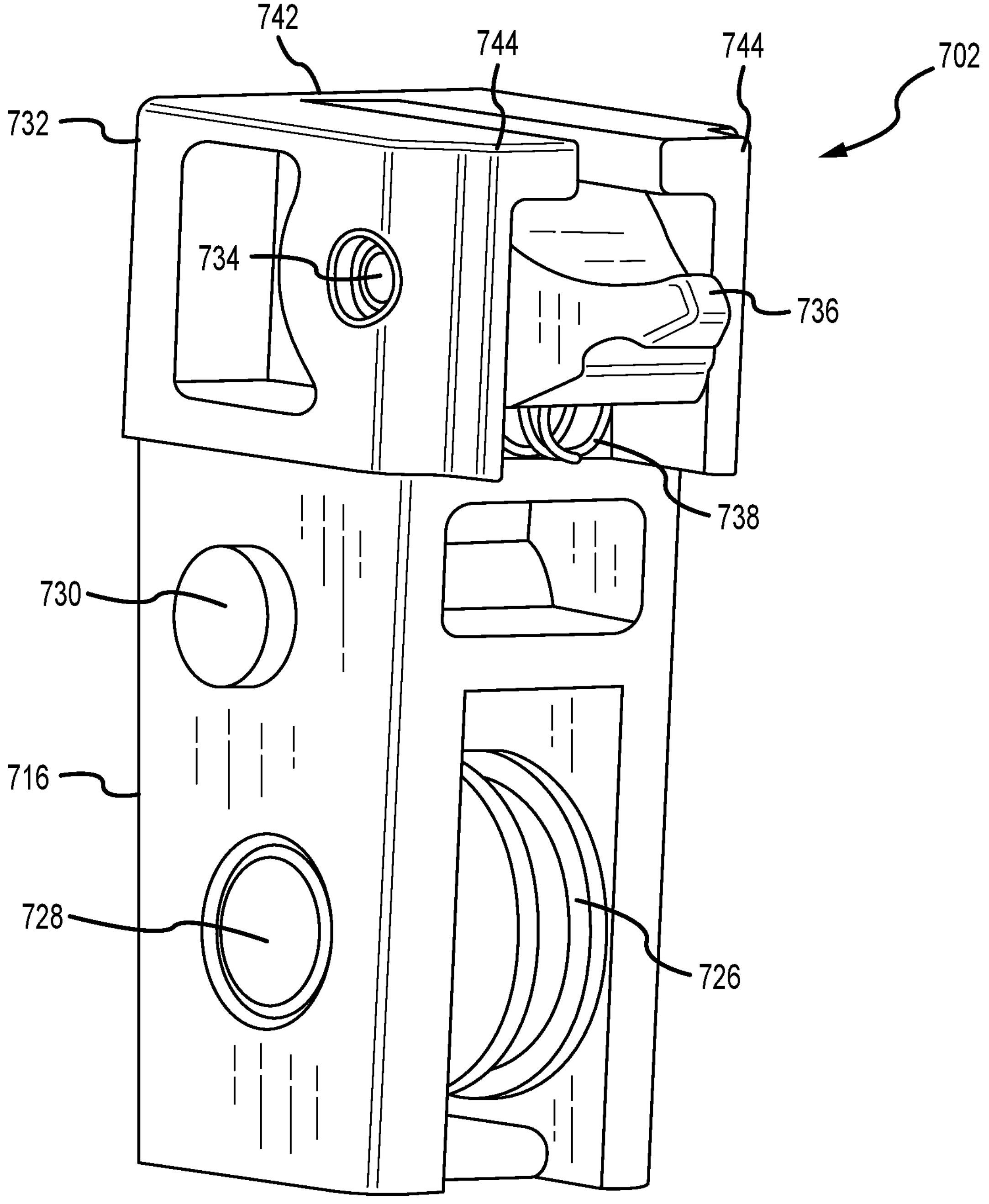
FIG. 20 is a perspective view of a locking device of the window balance system shown in FIGS. 18 and 19.
Figure 22:
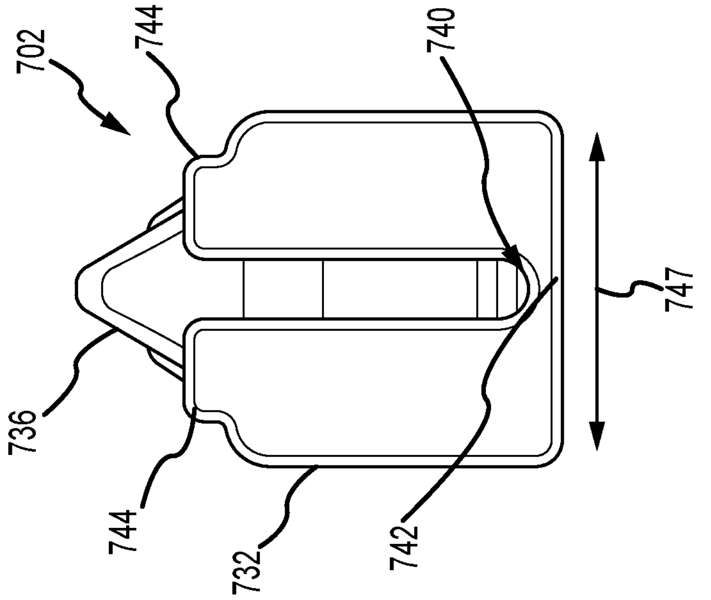
FIG. 22 is a top view of the locking device shown in FIG. 20.
Figure 21:
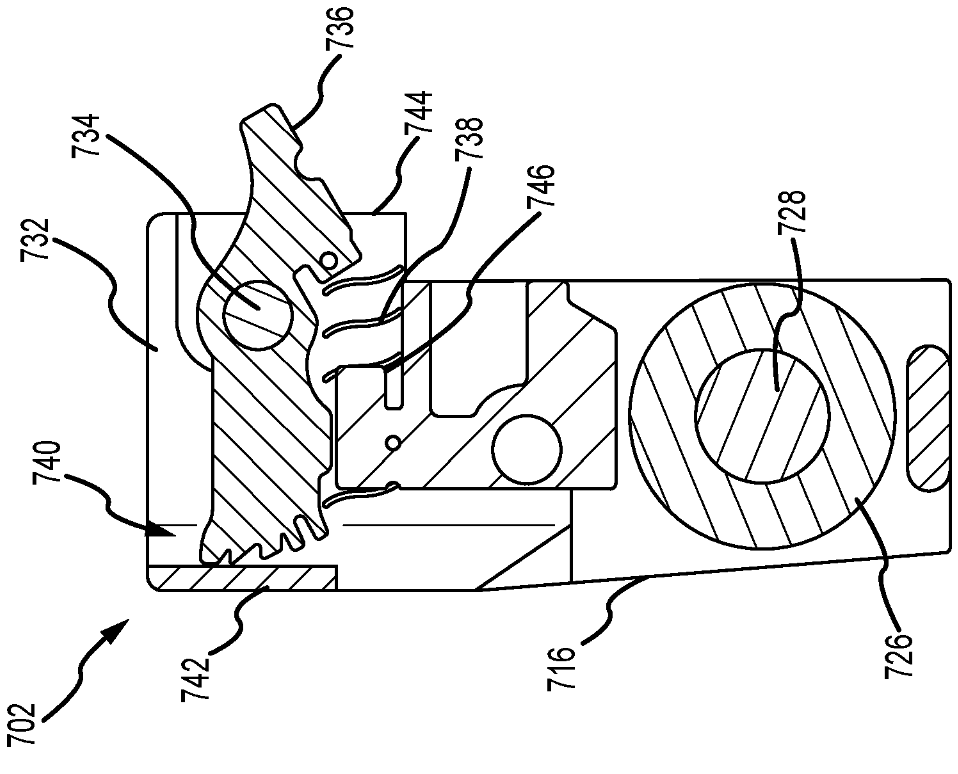
FIG. 21 is a cross-sectional view of the locking device shown in FIG. 20.

FIG. 20 is a perspective view of the locking device 702 of the window balance system 700 (shown in FIGS. 18 and 19). FIG. 21 is a cross-sectional view of the locking device 702. FIG. 22 is a top view of the locking device 702. Referring concurrently to FIGS. 20-22, the locking device 702 extends from the fixed pulley 716 and integral therewith. It should be appreciated that the locking device 702 can be a discrete and separate component as required or desired. The fixed pulley 716 has one or more wheels or rollers 726 disposed around an axle 728 to support the cord 706 (shown in FIGS. 18 and 19). Additionally, the fixed pulley 716 can be coupled to the U-shaped channel 708 (shown in FIGS. 18 and 19) by a rivet 730. In the example, the locking device 702 extends from the top of the fixed pulley 716 and includes a housing 732. The housing 732 supports an axle 734 so that a pawl 736 is rotatably coupled to the housing 732. A biasing element 738 (e.g., a compression spring) is at least partially housed within the housing 732 and biases a rotational position of the pawl 736. In an example, the biasing element 738 has a spring force of about 9 pounds/inch or greater so as to ensure pawl 736 engagement with the cord. The housing 732 also defines a substantially vertical opening 740 that the cord extends through. The opening 740 is partially defined by an engagement wall 742. When the locking device 702 locks, the cord is compressed between the pawl 736 and the wall 742.

Opposite of the engagement wall 742, the housing 732 includes a pair exterior shoulders 744. The shoulders 744 are disposed on either side of the pawl 736 and extend in a vertical direction (e.g., along the longitudinal axis 724 shown in FIGS. 18 and 19), while also protruding outward from the fixed pulley 716 in a horizontal direction (e.g., substantially orthogonal to the longitudinal axis 724). This configuration of the shoulders 744 results in the shoulder 744 protruding from the base wall 720 of the U-shaped channel 708 (shown in FIG. 18) when coupled thereto. The shoulders 744 are configured to contact the window jamb during pawl 736 disengagement with the cord and restrict undesirable movement of the locking device 702 within the window jamb as described further below in FIG. 24. The locking device 702 also includes a post 746 disposed within the housing 732 and configured for mounting the biasing element 738 within the housing 732. Additionally in the example, the housing 732 has a width 747 that corresponds to a width of the base wall 720 of the U-shaped channel 708. By approximately matching the width 747 of the housing 732 to the U-shaped channel 708, the locking device 702 still enables and does not interfere with the installation process of the window balance system as described above (e.g., the second rotation step).

Figure 23:
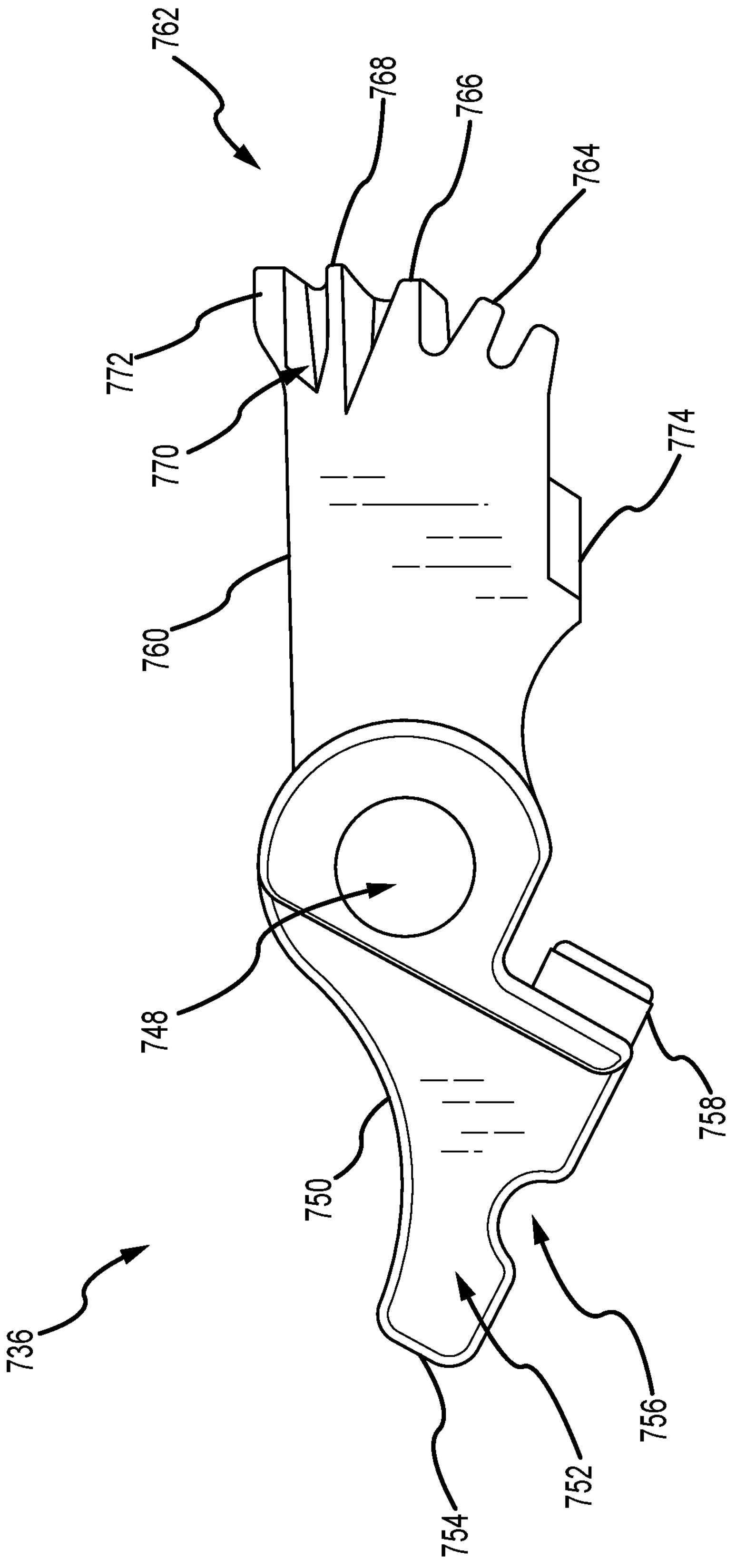
FIG. 23 is a side view of a pawl for the locking device shown in FIG. 20.

FIG. 23 is a side view of the pawl 736. The pawl 736 has an aperture 748 that is sized and shaped to receive the axle 734 (shown in FIG. 20) so that the pawl 232 is rotatable. Extending in one direction is an actuator arm 750 that is configured to engage with the window sash. In the example, the actuator arm 750 includes two oblique surfaces 752 that taper towards a nose 754. Additionally in this example, the actuator arm 750 includes a notch 756 formed on the bottom surface. The notch 756 enables the pawl 232 to have an increased rotational angle movement before being stopped by the housing 732 of the locking device 702 (shown in FIG. 20) during depression and unlocking of the cord. In an example, the pawl 736 can rotate about is axle 734 (shown in FIG. 20) between approximately 40° and 60° so as to lock and unlock the locking device. In an aspect, this rotational angle is approximately 52°. Opposite of the nose 754, a cylindrical projection 758 extends from the actuator arm 750 so that the actuator arm 750 can be coupled to the biasing element 738 (shown in FIG. 20).

Extending in another direction from the aperture 748 is a cord engagement arm 760 having a plurality of teeth 762. In this example, the engagement arm 760 has two leading teeth 764 with edges that are square, a middle tooth 766, and two compressing teeth 768. The middle tooth 766 and the two compressing teeth 768 are thicker when compared to the leading teeth 764 and have undercut surfaces 770 that can extend at least partially around to the sides of the pawl 736. In operation, the leading teeth 764 are configured to catch on the cord when locking and initiate rotation of the pawl 736 due to the movement of the cord. The middle tooth 766 then continues the rotation of the pawl 736 and beings to start compression of the cord at the engagement wall 742 (shown in FIG. 21). The compressing teeth 766 are then used to compress the cord and generate the locking force for the locking device. By using a plurality of teeth 762, the cord can be engaged gradually and cords that have more tension (e.g., use with heavier window sashes) are more easily engaged. In an aspect, the leading teeth 764 may not compress the cord. In other aspects, the leading teeth 764 may at least partially compress the cord during operation.

Because the compressing teeth 766 engage with the cord to lock movement, the teeth 766 are thickened to increase durability. Additionally, the top tooth includes a head 772 that increases the surface area for compression so as to increase the locking force of the pawl 736. In the example, the engagement arm 760 includes a step or stop 774 that is configured to engage with the housing 732 of the locking device 702 (shown in FIG. 20) so as to reduce or prevent over rotation of the pawl 736 and define a rotational stop for the pawl 736. This prevents the pawl 736 from rolling over center and being pulled through the opening of the housing. When disengaging with the cord, the actuator arm 750 is depressed by the window sash to initiate reverse rotation of the teeth 768. In some examples, the top edge of the compressing teeth 766 include square edges that help facilitate this reverse unlocking rotation and disengagement of the cord.

Figure 24:
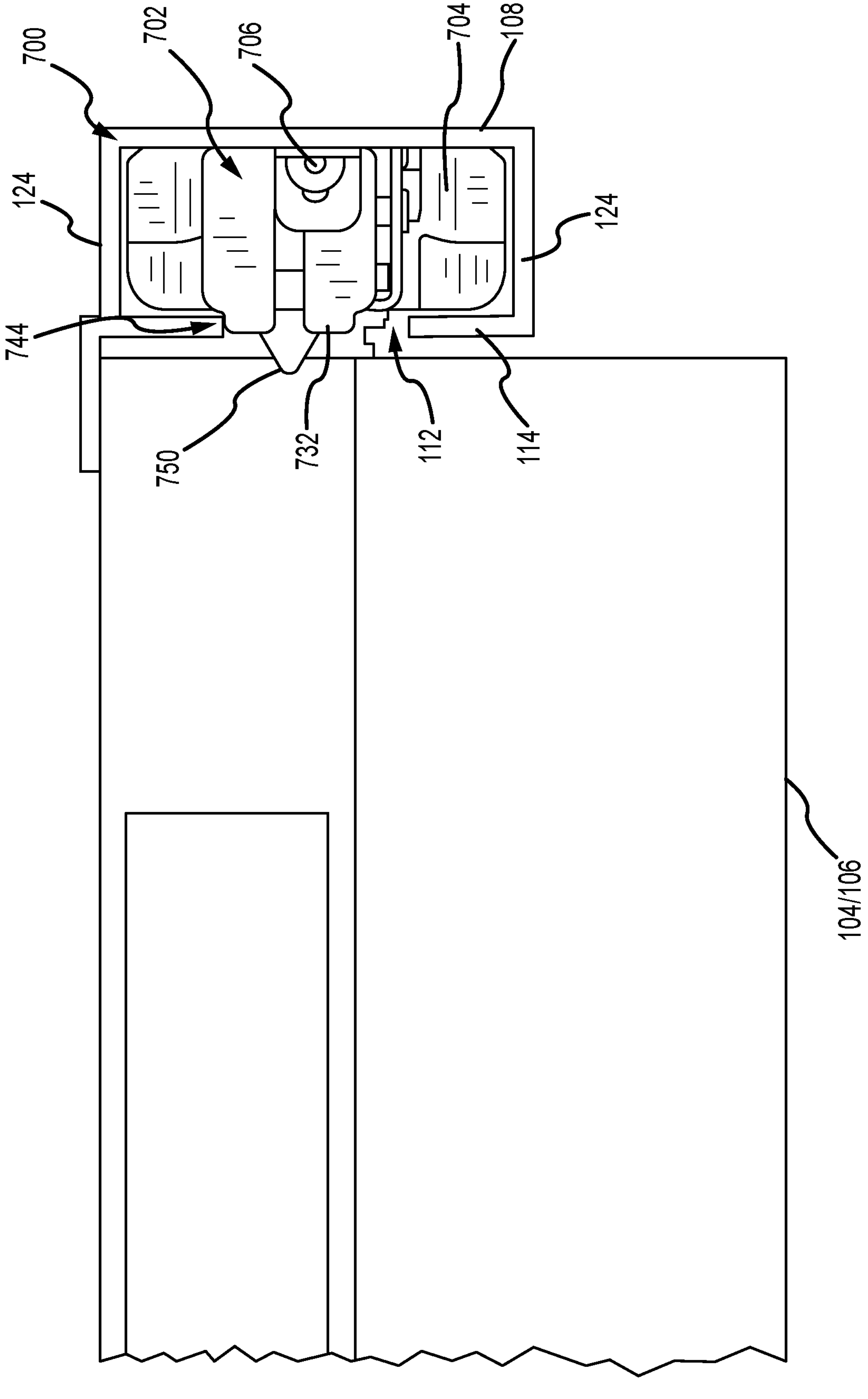
FIG. 24 is a top view of the window balance system shown in FIGS. 18 and 19 mounted within a window jamb.

FIG. 24 is a top view of the window balance system 700 mounted within the window jamb 108. Certain components are described above, and thus, are not necessarily described further. As illustrated in FIG. 24, the window sash 104, 106 is tilted so that the locking device 702 is in the locked configuration and engaged with the cord 706. In the locked configuration, the shoulders 744 contact the front wall 114 of the window jamb 108 and the locking device 702 extends at least partially into the elongate slot 112. In an aspect, the shoulders 744 are sized and shaped to at least partially receive an edge of the front wall 114. This engagement between the locking device 702 and the front wall 114 restricts the housing 732 from sliding towards the side walls 124 of the window jamb 108 and pinching the actuator arm 750 between the window sash 104, 106 and the front wall 114 resulting in difficult disengagement of the locking device 702 or even preventing disengagement of the locking device 702. Instead, the shoulders 744 enable the locking device 702 to remain square to the window sash 104, 106.

Figure 26:
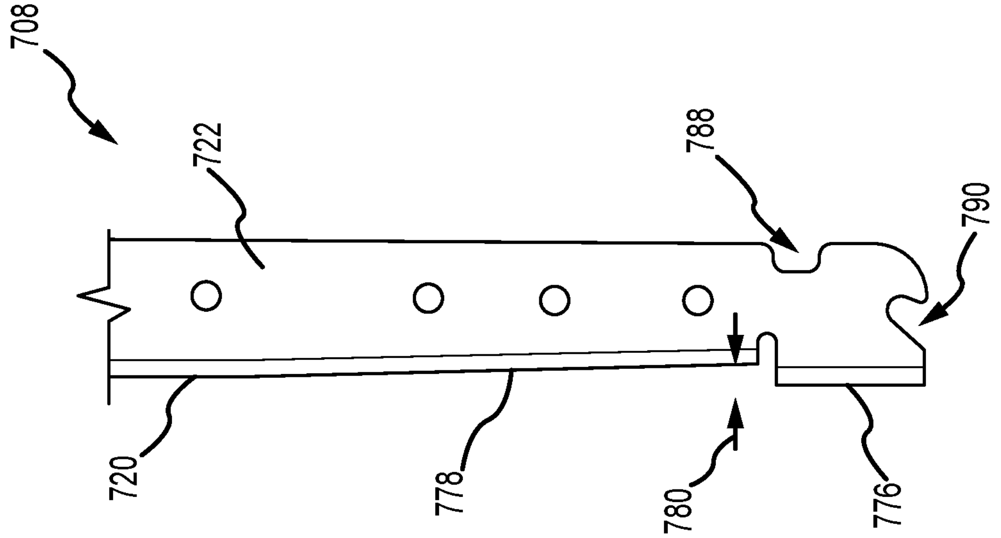
FIG. 26 is a partial side view of the U-shaped channel shown in FIG. 25.
Figure 25:
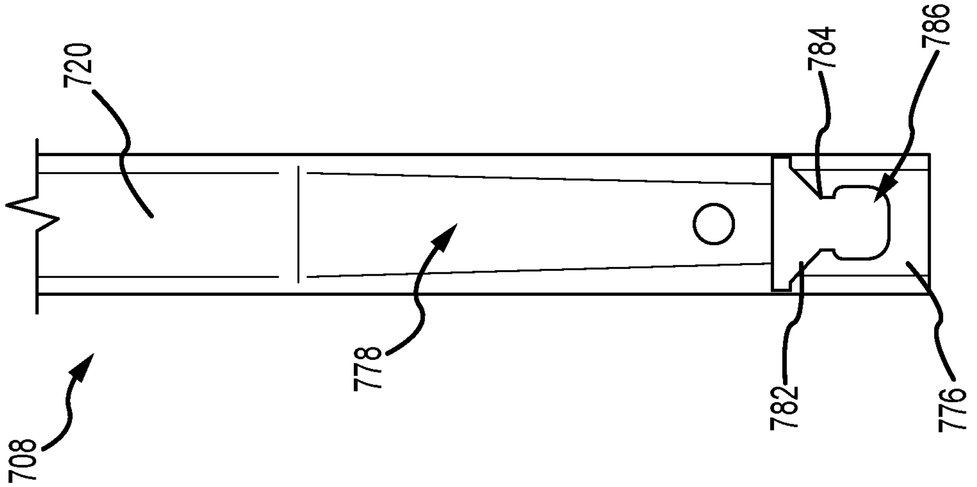
FIG. 25 is a partial front view of a U-shaped channel of the window balance system shown in FIGS. 18 and 19.

FIG. 25 is a partial front view of the U-shaped channel 708 of the window balance system 700 (shown in FIGS. 18 and 19). FIG. 26 is a partial side view of the U-shaped channel 708. Referring concurrently to FIGS. 25 and 26, the bottom of the U-shaped channel 708 is configured to directly receive the pivot bar 116 (shown in FIGS. 4 and 5) extending from the window sash. The U-shaped channel 708 includes the base wall 720 and two opposing walls 722. At the bottom end of the U-shaped channel 708, a receiver 776 is formed at the base wall 720. The base wall 720 includes a groove 778 that terminates prior to the receiver 776 and is tapered so as to allow the pivot bar to be dropped in. The receiver 776 projects a separation distance 780 from the terminal end of the groove 778 and includes a pair of opposing leading surfaces 782 that lead to a throat 784. In an example, the face of the receiver 776 is aligned with the face of the base wall 720 prior to the tapering groove 778. Below the throat 784 is a pivot bar opening 786 that is shaped and sized to receive the pivot bar.

Opposite the receiver 776, each wall 722 includes a cutout 788 that is disposed on the rear of the U-shaped channel 708. The cutout 788 provides space for the U-shaped channel 708 to rotate within the window jamb during the first rotation step of the installation process. In the example, the cutout 788 is substantially square shaped, although the cutout 788 can be of any size and/or shape that enables the installation process of the window balance system as described herein.

The walls 722 of the U-shaped channel 708 also have a notch 790 defined at the end of the U-shaped channel 708. The notch 790 is configured to engage with a corresponding projection defined in the shoe 704 (shown in FIGS. 18 and 19) so as to form a more robust coupling and increase the strength of the receiver 776. In operation, the receiver 776 is designed to resist a pullout force from the pivot bar (e.g., a force acting along an longitudinal axis of the bar) and a bending force from the pivot bar (e.g., a force acting at the end of the bar generating a twist at the receiver). In the examples described herein, the shoe engages with the U-shaped channel 708 so as to increase the resistance of the receiver from both the pullout forces and the bending forces. Additionally, the shoe facilitates installation of the balance window system within the window jamb and in the three step process described above. The shoe 704 is described in further detail below in FIGS. 27-29.

Figure 27:
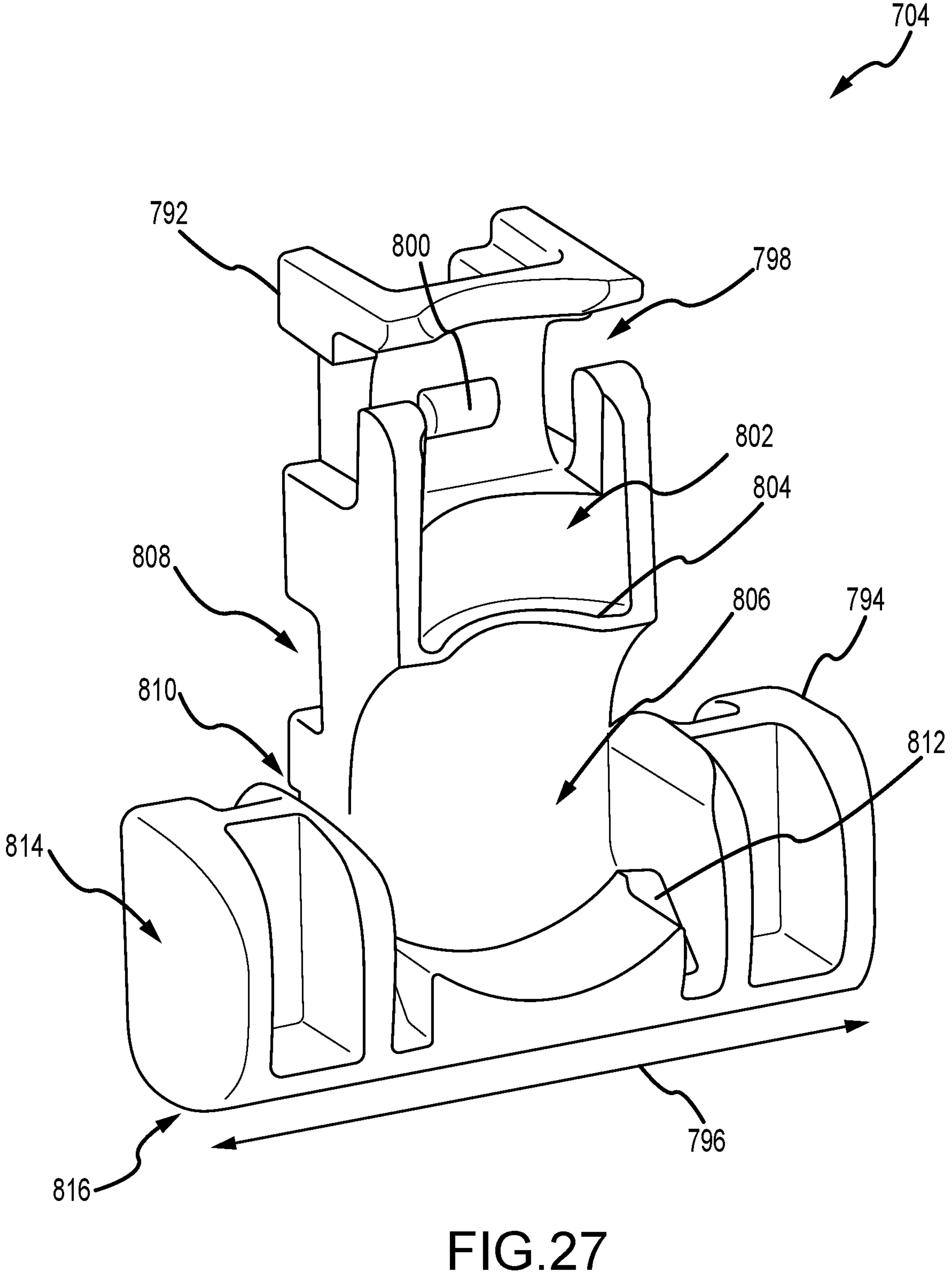
FIG. 27 is a perspective view of a shoe of the window balance system shown in FIGS. 18 and 19.
Figure 29:
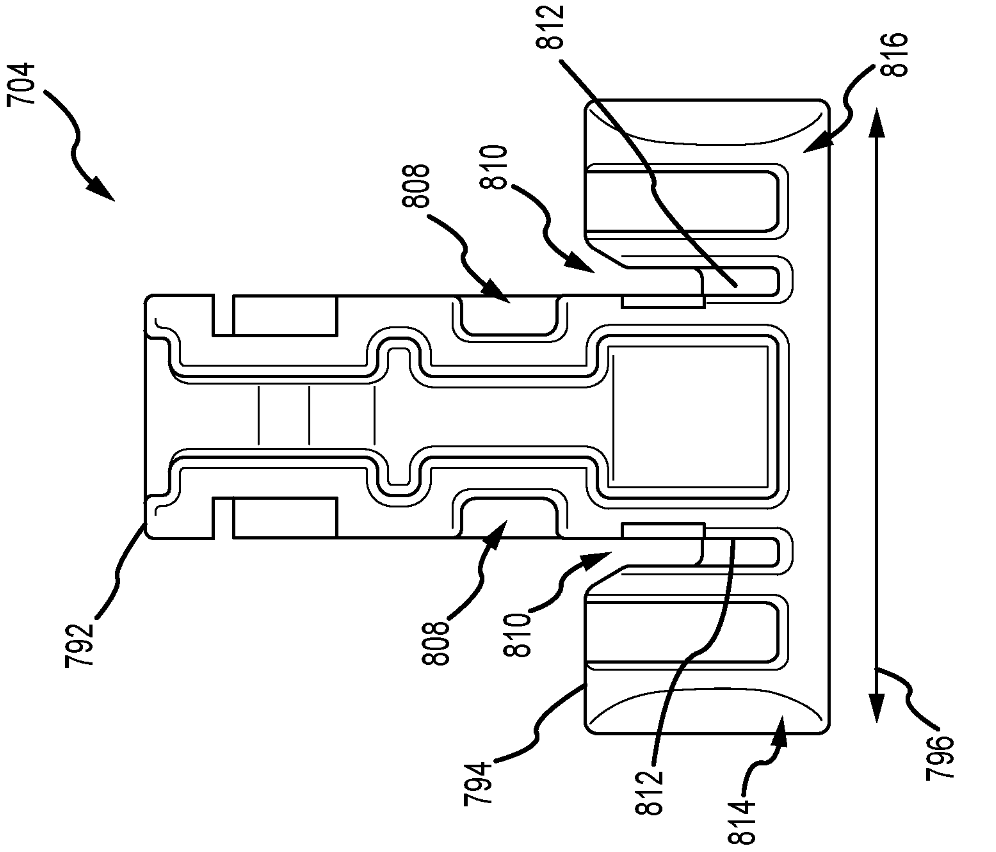
FIG. 29 is a rear view of the shoe shown in FIG. 27.
Figure 28:
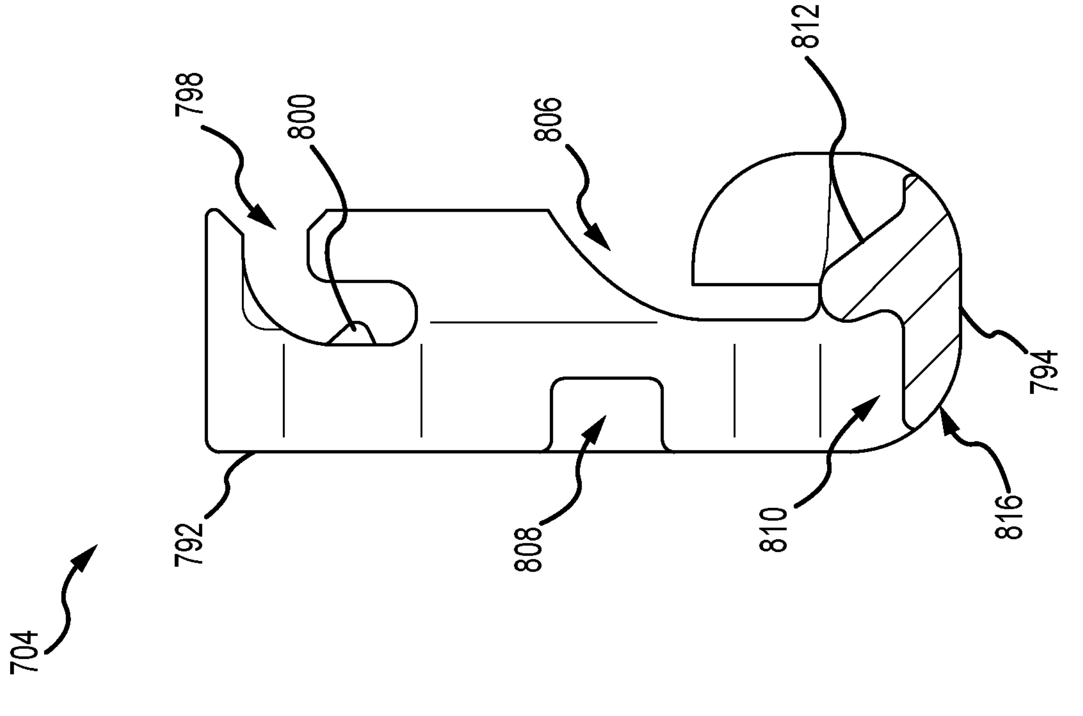
FIG. 28 is a cross-sectional view of the shoe shown in FIG. 27.

FIG. 27 is a perspective view of the shoe 704 of the window balance system 700 (shown in FIGS. 18 and 19). FIG. 28 is a cross-sectional view of the shoe 704. FIG. 29 is a rear view of the shoe 704. Referring concurrently to FIGS. 27-29, the shoe 704 includes an elongate portion 792 and an enlarged portion 794 such that the shoe 704 is substantially T-shaped. The elongate portion 792 is configured to couple to and be at least partially received within the bottom end of the U-shaped channel 708 (shown in FIGS. 25 and 26) proximate the receiver. The elongate portion 792 extends along the longitudinal axis 724 of the channel 708 (shown in FIG. 18). The enlarged portion 794 is substantially orthogonal to the elongate portion 792 and has a width 796. In the example, the shoe 704 is a molded unitary component having no moving parts. In other examples, the shoe 704 may be formed from two or more components that are coupled together. In this example, the elongate portion 792 and the enlarged portion 794 can be discrete components that are coupled together, and as such, higher wear components can be more easily replaced or repaired.

The front side of the shoe 704 includes a hook 798 that is configured to engage with a rivet spanning between the walls of the U-shaped channel 708. In the example, the hook 798 is defined as a slot within the shoe 794 and is shaped and sized to receive the rivet. Within the hook 798, a detent 800 is provided so that the rivet can be held at the terminal end of the hook 798 when assembled within the U-shaped channel 708. Below the hook 798, the shoe 704 includes a groove 802 that is shaped and sized to receive the end of the groove 778 of the U-shaped channel 708 (shown in FIGS. 25 and 26). The groove 778 can rest on a shelf 804 that is disposed at the end of the groove 802 of the shoe 704. The front side of the shoe 704 also includes a chamber 806. The chamber 806 is sized and shaped to receive at least a portion of the head of the pivot bar 116 (shown in FIG. 5) and is aligned at the end of the groove 778 of the U-shaped channel 708 when the shoe 704 and the channel 708 are coupled together. At least some of the surfaces of the chamber 806 are curved so as to accommodate rotation of the pivot bar within the chamber 806. In the example, the chamber 806 is defined in both the elongate portion 792 and the enlarged portion 794 and does not extend all the way to the rear side of the shoe 704. This configuration enables the elongate portion 792 and the enlarged portion 794 to be integral with each other. The chamber 806 is disposed on the same side of the shoe 704 (e.g., the front side) as the hook 798.

The rear side of the shoe 704 includes a pair of cutouts 808 that are defined on both sides of the elongate portion 792. The cutouts 808 are sized and shaped to correspond with the cutouts 788 on the U-shaped channel 708 (shown in FIG. 26) so as to provide clear space within the window balance system for rotation relative to the window jamb during the installation process.

A pair of slots 810 are defined in the top of the enlarged portion 794 and are disposed on both sides of the elongate portion 792. The slots 810 extend from the front of the shoe 704 to the rear of the shoe 704 and are configured to receive the ends of the walls 722 of the U-shaped channel 708 (shown in FIG. 26). Within the slots 810, the shoe 704 includes projections 812. The projections 812 are sized and shaped to engage with the corresponding notches 790 within the walls 722 of the U-shaped channel 708 (shown in FIG. 26). This engagement between the enlarged portion 794 and the U-shaped channel 708 increases the strength of the receiver 776 of the U-shaped channel 708 (shown in FIGS. 25 and 26) with respect to pull out strength and twisting strength. In some examples, this strength is greater than the shoe example described in FIGS. 15-17 with the catch and locking tab connectors. In the example, the projections 812 and notches 790 are substantially triangular in shape. In other examples, the projections 812 and notches 790 can have any other size and/or shape that enables the window balance system to function as described herein. Additionally, because the U-shaped channel 708 has to engage with the projections 812, the hook 798 is elongated in the elongate portion 792 direction so that the rivet can engage with the hook 798 and slide therein before catching on the detent 800.

The enlarged portion 794 includes two opposing end surfaces 814 and a bottom surface 816. In the example, the end surfaces 814 and the bottom surface 816 are curved surfaces. These surfaces are the portions of the shoe 704 that slide against the window jamb during installation, and as such, forming these surfaces as curved components, increases installation efficiencies. For example, during the first rotation step the end surfaces 814 slide against the window jamb, and the curved surfaces decrease frictional resistance with and wear on the window jamb. Similarly, during the second rotation step the bottom surface 816 slides against the window jamb, and the curved surface decreases frictional resistance with and wear on the window jamb.

Figure 30:
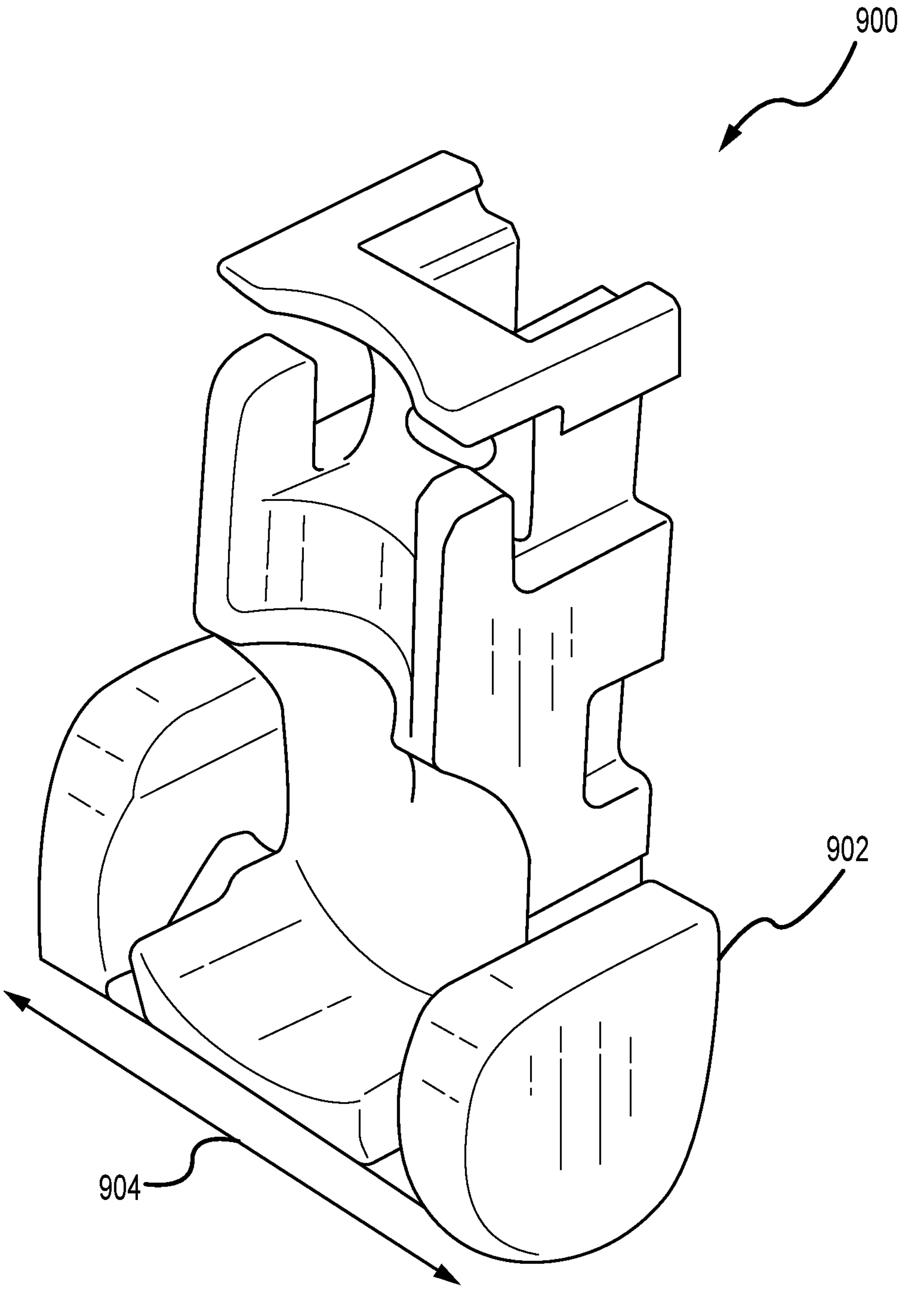
FIG. 30 is a perspective view of another shoe for use with the window balance system shown in FIGS. 18 and 19.

FIG. 30 is a perspective view of another shoe 900 for use with the window balance system 700 (shown in FIGS. 18 and 19). The shoe 900 is substantially similar to the shoe 704 described above in FIGS. 27-29, and as such, similar features will not be described further. In this example, however, an enlarged portion 902 has a width 904 that is smaller than the width 796 of the shoe 704 (shown in FIG. 29). For example, the width 904 may be about 1 inch, while the width 796 may be about 1-¼ inch. Accordingly, it should be appreciated that the enlarged portion 902 can be tailored so as to correspond to any window jamb size while still providing the benefits of the window balance system as described herein.

The materials utilized in the window balance systems described herein may be those typically utilized for window and window component manufacture. Material selection for most of the components may be based on the proposed use of the window. Appropriate materials may be selected for the sash retention systems used on particularly heavy window panels, as well as on windows subject to certain environmental conditions (e.g., moisture, corrosive atmospheres, etc.). Aluminum, steel, stainless steel, zinc, or composite materials can be utilized (e.g., for the U-shaped channel). Bendable and/or moldable plastics may be particularly useful (e.g., for the housings).

Any number of the features of the different examples described herein may be combined into one single example and alternate examples having fewer than or more than all of the features herein described are possible. It is to be understood that terminology employed herein is used for the purpose of describing particular examples only and is not intended to be limiting. It must be noted that, as used in this specification, the singular forms "a," "an," and "the" include plural referents unless the context clearly dictates otherwise.

While there have been described herein what are to be considered exemplary and preferred examples of the present technology, other modifications of the technology will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the technology. Accordingly, what is desired to be secured by Letters Patent is the technology as defined and differentiated in the following claims, and all equivalents.

What is claimed is:

1. A locking device for a block and tackle window balance system having a cord, the locking device comprising:
- a housing;
- a pawl rotatably coupled to the housing, the pawl having a first end and an opposite second end, wherein the pawl is movable between at least a locked configuration and an unlocked configuration;
- a biasing member biasing the pawl towards the locked configuration; and
- wherein in the locked configuration, the first end of the pawl extends at least partially out of the housing and the second end engages with the cord so as to restrict movement of the cord past the pawl.

2. The locking device of claim 1, wherein in the unlocked configuration, the first end of the pawl retracts at least partially into the housing and the second end disengages from the cord.

3. The locking device of claim 1, wherein the second end of the pawl includes one or more teeth.

4. The locking device of claim 1, wherein the first end of the pawl includes a tapered nose.

5. The locking device of claim 1, wherein the housing defines an opening that the cord extends through.

6. The locking device of claim 1, wherein the locked configuration of the pawl is at least partially defined by a stop formed by the housing.

7. The locking device of claim 1, wherein the housing is coupled to a pulley block of the block and tackle window balance system.

8. A block and tackle window balance system comprising:
- an elongated channel;
- a fixed pulley coupled to the elongated channel;
- a movable pulley slidably disposed within the elongated channel;
- a cord extending between the fixed pulley and the movable pulley;
- a spring coupled between the elongated channel and the movable pulley; and
- a locking device movable between at least a locked configuration and an unlocked configuration with respect to the cord, in the unlocked configuration, the cord is movable with respect to the elongated channel such that the elongated channel is slidable within a window jamb, and in the locked configuration, the cord is engaged such that the elongated channel is held in place within the window jamb.

9. The block and tackle window balance system of claim 8, wherein the locking device includes a rotatable pawl configured to engage with the cord.

10. The block and tackle window balance system of claim 9, wherein the rotatable pawl rotates around an axis that is orthogonal to the elongated channel.

11. The block and tackle window balance system of claim 8, wherein in the locked configuration, the locking device compresses the cord.

12. The block and tackle window balance system of claim 8, wherein the locking device is coupled to the elongated channel.

13. The block and tackle window balance system of claim 8, wherein the locking device is biased towards the locked configuration.

14. The block and tackle window balance system of claim 8, wherein the cord includes a jamb mounting attachment configured to mount to the window jamb.

15. The block and tackle window balance system of claim 14, wherein the jamb mounting attachment includes a hook.

16. A window balance system for a tilting window sash, the window balance system comprising:
- an elongated channel configured to couple to the window sash;
- a fixed pulley coupled to the elongated channel;
- a movable pulley slidably disposed within the elongated channel;
- a cord extending between the fixed pulley and the movable pulley;
- a spring coupled between the elongated channel and the movable pulley; and
- a locking device movable between at least a locked configuration and an unlocked configuration with respect to the cord, wherein in the locked configuration, the window sash is in a tilted position and the locking device engages the cord so as to hold the elongated channel in place, and in the unlocked configuration, the window sash is in a vertical position and the locking device allows the cord to slidably position the elongated channel.

17. The window balance system of claim 16, further comprising a shoe coupled to the elongated channel and configured to at least partially receive a pivot bar extending from the window sash.

18. The window balance system of claim 16, wherein the locking device comprises a rotatable pawl biased toward the locked configuration.

19. The window balance system of claim 18, wherein the rotatable pawl includes a tapered nose with a pair of oblique surfaces configured to engage with the window sash so as to move the locking device between the locked configuration and the unlocked configuration.

* * * * *